US011624151B2

(12) United States Patent
Grunlan et al.

(10) Patent No.: US 11,624,151 B2
(45) Date of Patent: Apr. 11, 2023

(54) COATINGS FOR MATERIALS

(71) Applicant: The Texas A&M University System, College Station, TX (US)

(72) Inventors: Jaime Christopher Grunlan, College Station, TX (US); Ryan J. Smith, Bryan, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 535 days.

(21) Appl. No.: 16/494,957

(22) PCT Filed: Mar. 21, 2018

(86) PCT No.: PCT/US2018/023613
§ 371 (c)(1),
(2) Date: Sep. 17, 2019

(87) PCT Pub. No.: WO2018/183060
PCT Pub. Date: Oct. 4, 2018

(65) Prior Publication Data
US 2020/0011007 A1    Jan. 9, 2020

Related U.S. Application Data

(60) Provisional application No. 62/477,979, filed on Mar. 28, 2017.

(51) Int. Cl.
 *D06M 16/00* (2006.01)
 *D06M 15/03* (2006.01)
 (Continued)

(52) U.S. Cl.
 CPC ............ *D06M 16/00* (2013.01); *D06M 15/03* (2013.01); *D06M 15/263* (2013.01); *D06M 15/3562* (2013.01)

(58) Field of Classification Search
 CPC .... D06M 16/00; D06M 15/03; D06M 15/263; D06M 15/3562; D06M 11/72;
 (Continued)

(56) References Cited

U.S. PATENT DOCUMENTS 8,217,220 B2    7/2012  Berland et al.
2003/0065051 A1  4/2003  Winterton et al.
(Continued)

FOREIGN PATENT DOCUMENTS

CN    101277727 A    10/2008
CN    102632022 A     8/2012
(Continued)

OTHER PUBLICATIONS

Chinese Office Action dated Oct. 28, 2021, for Chinese Application No. 201880022707.9 (8 p.).
(Continued)

*Primary Examiner* — Jennifer A Steele
(74) *Attorney, Agent, or Firm* — Conley Rose, P.C.

(57) ABSTRACT

A textile includes a substrate and a coating applied to a surface of the substrate. The coating includes a plurality of bilayers positioned one on top of the other. Each bilayer includes a first layer including a cationic polymer and a second layer comprising an anionic polymer. The cationic polymer in the first layer includes a polyethyleneimine (PEI), a poly(vinyl amine) (PVAm), a poly(allyl amine) (PAAm), a polydiallyldimethylammonium chloride (PDDA), or a chitosan (CH). The anionic polymer in the second layer includes a poly(acrylic acid) (PAA), a poly (styrene sulfonate) (PSS), a poly(methacrylic acid) (PMAA), a poly(sodium phosphate) (PSP), or a poly(vinyl sulfate) (PVS).

12 Claims, 13 Drawing Sheets

(51) Int. Cl.
*D06M 15/263* (2006.01)
*D06M 15/356* (2006.01)

(58) Field of Classification Search
CPC .......... D06M 15/233; D06M 15/3566; D06M 23/005; D06M 15/00; A01N 33/04; A01N 33/12; A01N 33/00; B32B 27/12
See application file for complete search history.

(56) References Cited

U.S. PATENT DOCUMENTS

| | | | |
|---|---|---|---|
| 2005/0152955 A1* | 7/2005 | Akhave | A61L 15/46 424/445 |
| 2006/0021150 A1* | 2/2006 | Hu | D06M 15/267 8/115.51 |
| 2006/0029808 A1 | 2/2006 | Zhai et al. | |
| 2007/0020469 A1* | 1/2007 | Wood | B82Y 30/00 428/411.1 |
| 2007/0104922 A1 | 5/2007 | Zhai et al. | |
| 2007/0166513 A1 | 7/2007 | Sheng et al. | |
| 2008/0129956 A1 | 6/2008 | Winterton et al. | |
| 2009/0047517 A1 | 2/2009 | Caruso et al. | |
| 2009/0275906 A1* | 11/2009 | Berland | B82Y 30/00 604/360 |
| 2009/0288369 A1 | 11/2009 | Winterton et al. | |
| 2010/0080841 A1 | 4/2010 | Porbeni et al. | |
| 2010/0242409 A1 | 9/2010 | Winterton et al. | |
| 2011/0019186 A1 | 1/2011 | Himmelhaus et al. | |
| 2011/0076504 A1 | 3/2011 | Van de Weerdt et al. | |
| 2011/0250253 A1 | 10/2011 | Cunkle et al. | |
| 2011/0250353 A1 | 10/2011 | Caruso et al. | |
| 2012/0314183 A1 | 12/2012 | Nakamura et al. | |
| 2013/0064990 A1 | 3/2013 | Lu et al. | |
| 2013/0112618 A1 | 5/2013 | Diallo et al. | |
| 2014/0079922 A1 | 3/2014 | Wang et al. | |
| 2014/0093575 A1 | 4/2014 | Hammond et al. | |
| 2014/0198294 A1 | 7/2014 | Nakamura et al. | |
| 2014/0198295 A1 | 7/2014 | Fukisawa et al. | |
| 2014/0202953 A1 | 7/2014 | Choi et al. | |
| 2014/0206534 A1 | 7/2014 | Mulqueen et al. | |
| 2014/0240660 A1 | 8/2014 | Fujisawa et al. | |
| 2014/0249031 A1 | 9/2014 | Mulqueen et al. | |
| 2014/0285765 A1 | 9/2014 | Fujisawa et al. | |
| 2014/0319049 A1 | 10/2014 | Tang et al. | |
| 2014/0333893 A1 | 11/2014 | Kitagawa et al. | |
| 2014/0336039 A1 | 11/2014 | Cohen et al. | |
| 2015/0037375 A1 | 2/2015 | Grinstaff et al. | |
| 2015/0045207 A1 | 2/2015 | Sukhishvili et al. | |
| 2015/0071982 A1* | 3/2015 | Lee | A61L 27/34 427/2.24 |
| 2015/0177417 A1 | 6/2015 | Nakamura et al. | |
| 2015/0258506 A1 | 9/2015 | Mi et al. | |
| 2015/0368481 A1 | 12/2015 | Zhu et al. | |
| 2016/0008769 A1 | 1/2016 | Dubois et al. | |
| 2016/0090487 A1 | 3/2016 | Martorana et al. | |
| 2016/0152008 A1 | 6/2016 | Ogata et al. | |

FOREIGN PATENT DOCUMENTS

| | | | | |
|---|---|---|---|---|
| CN | 102933762 A | | 2/2013 | |
| CN | 104383609 A | | 3/2015 | |
| EP | 0603987 A1 | * | 6/1994 | .......... D06M 15/263 |
| JP | 2004507580 A | * | 3/2004 | ............ A01N 33/04 |
| WO | WO-0117357 A1 | * | 3/2001 | ............ A01N 25/24 |
| WO | WO-2007038966 A1 | * | 4/2007 | ........ A61F 13/51121 |
| WO | WO-2007140402 A1 | * | 12/2007 | ............ B82Y 30/00 |

OTHER PUBLICATIONS

English Translation of Chinese Office Action dated Oct. 28, 2021, for Chinese Application No. 201880022707.9 (10 p.).
PCT/US2018/023613 International Search Report and Written Opinion dated Jun. 14, 2018 (16 p.).
PCT/US2018/023613 Demand and Article 34 Amendments filed Sep. 14, 2018 (23 p.).
PCT/US2018/023613 2nd Written Opinion dated Feb. 21, 2019 (8 p.).
Voracek, Charlene M. et al., "Antimicrobial Behavior of Polyelectrolyte-Surfactant Thin Film Assemblies," American Chemical Society, Langumuir, 2009, vol. 25, No. 17, pp. 10322-10328 (7 p.).
Zhu, Xiaoying et al., "Layer-by-Layer Assemblies for Antibacterial Applications," Biomaterials Science, vol. 3, No. 12, Dec. 2015, pp. 1499-1580 (15 p.).
Zhu, Xiaoying et al., "Polyion Multilayers with Precise Surface Charge Control for Anlifouling," Applied Materials and Interfaces, American Chemical Society, vol. 7, 2015, pp. 852-861 (10 p.).
Leistner, Marcus et al., "Water-Based Chitosan/Melamine Polyphosphate Multilayernanocoating that Extinguishes Fire on Polyester-Cotton Fabric," Carbohydrate Polymers, vol. 130, 2015, pp. 227-232 (6 p.).
Zhu, Xiaoying et al., "Engineered, Robust Polyelectrolyte Multilayers by Precise Control of Surface Potential for Designer Protein, Cell, and Bacteria Adsorption," American Chemical Society, Langmuir, vol. 32, 2016, pp. 1338-1346 (9 p.).

* cited by examiner

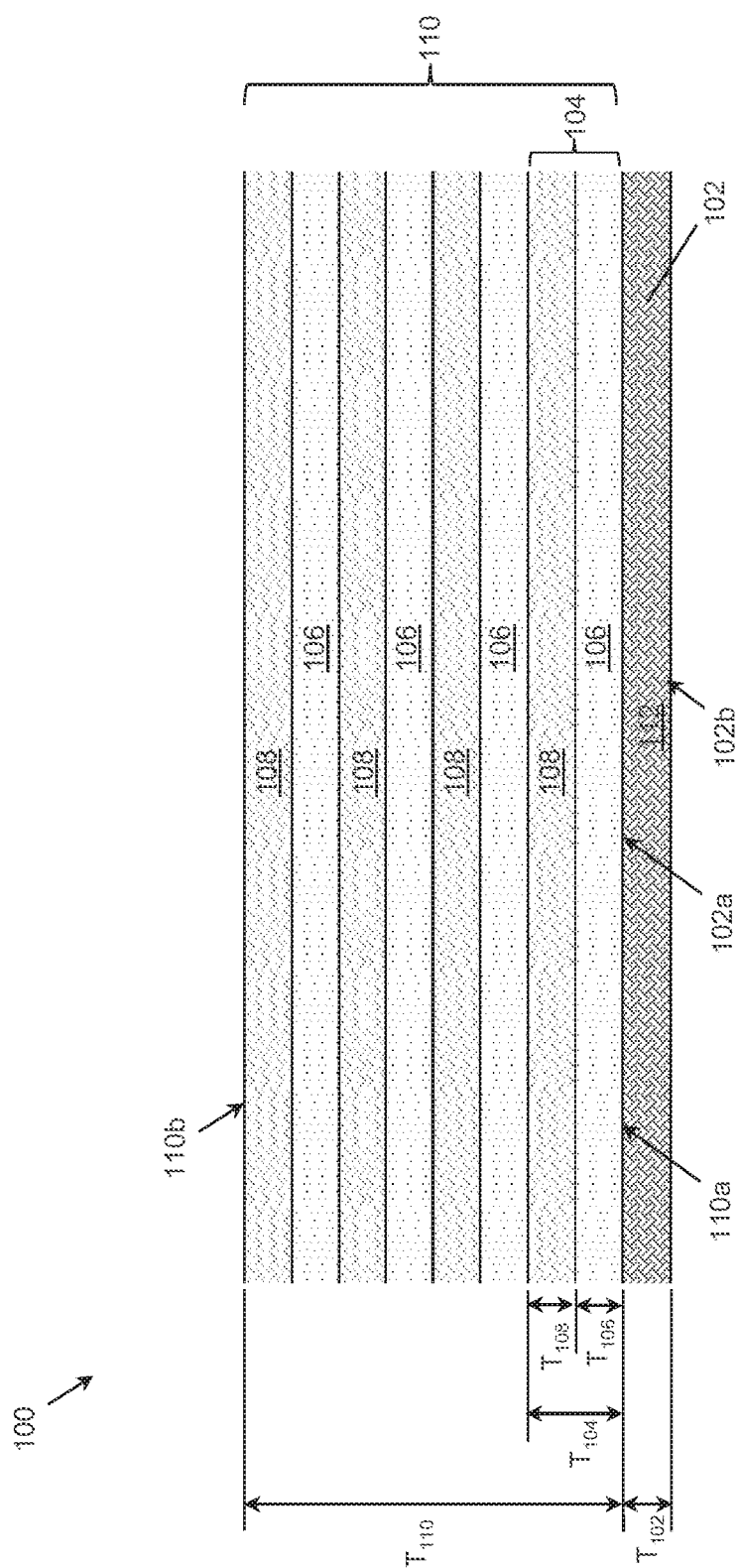

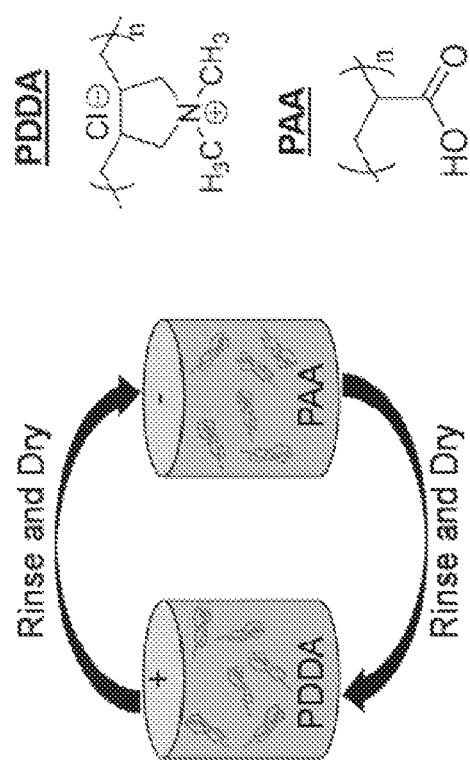 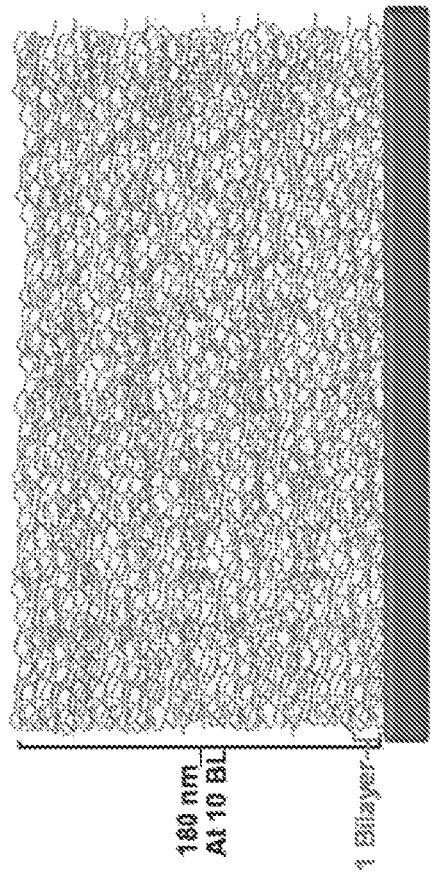
FIG. 4

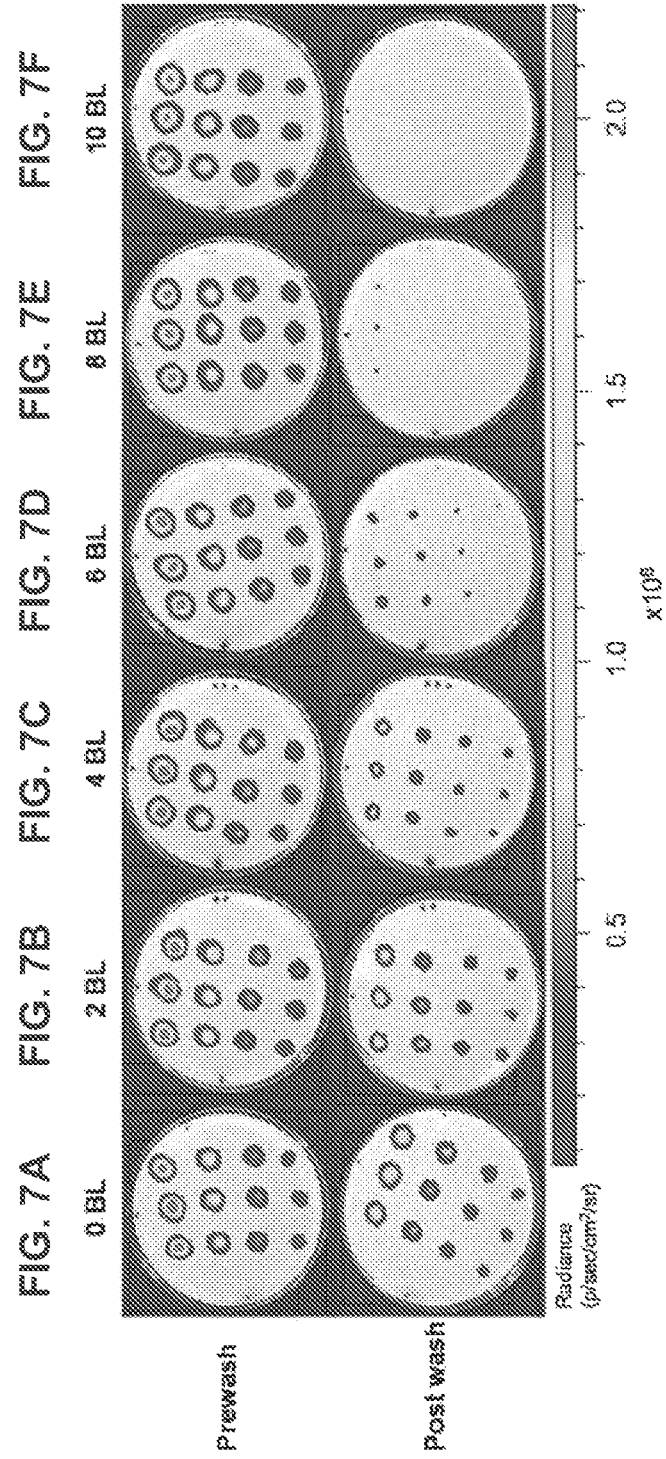

COATINGS FOR MATERIALS

CROSS-REFERENCE TO RELATED APPLICATIONS

This application is a 35 U.S.C. § 371 national stage application of PCT/US2018/023613 filed Mar. 21, 2018, entitled "Coatings for Materials,' which claims benefit of U.S. provisional patent application Ser. No. 62/477,979 filed Mar. 28, 2017, and entitled "Coatings for Materials," each of which is hereby incorporated herein by reference in its entirety for all purposes.

STATEMENT REGARDING FEDERALLY SPONSORED RESEARCH OR DEVELOPMENT

Not applicable.

BACKGROUND

Biological adhesion is a problem that persists in industries including oceanic shipping, medical devices, and textiles. Textiles are very prevalent in hospitals across the world, and are found in clothing, linens and wound dressings. Adhesion of bacteria such *Staphylococcus aureus* (*S. aureus*), including methicillin-resistant *S. aureus* (MRSA) to the surfaces of such textiles can allow their transport and subsequent transfer to medical devices and surgical sites, potentially resulting in undesirable bacterial infections.

Bacterial adhesion to textiles used to make clothing can also lead to other undesirable consequences. For instance, when a person sweats, salt and bacteria are transferred to the clothing. The bacteria can cause illness and unpleasant odors (i.e., fouling), even after laundering the clothing. Athletic apparel and workwear are worn during physical activity are particularly susceptible to such bacteria transfer.

One previous approach to combat bacterial adhesion on textiles was to incorporate a bactericidal agent such as a metal (e.g., silver, including silver nano particles) in the textile. However, any bacteria that can survive exposure to the bactericidal agent can reproduce with greater immunity and the textile eventually loses its effectiveness. In addition, the bactericidal agent may wear away or be washed out over time, thereby decreasing its effectiveness. Still further, with respect to metal bactericidal agents incorporated into textiles, metal discarded during the manufacturing process, as well as when textiles containing the metal are thrown away, may be considered toxic to the environment, particularly when the metal is a nano particle.

BRIEF DESCRIPTION OF THE DRAWINGS

For a detailed description of the preferred aspects of the invention, reference will now be made to the accompanying drawings in which:

FIG. 1A is a schematic cross-sectional view of a textile including an aspect of a coating in accordance with the principles described herein.

FIG. 4 is a schematic illustration of an aspect of a coating process in accordance with principles described herein.

FIGS. 7A-7F are bioluminescent images of an uncoated sample of polyester fabric (FIG. 7A) and coated samples of polyester fabric (FIGS. 7B-7F) fabricated in accordance with principles described herein and as tested with *S. aureus* bacteria.

DETAILED DESCRIPTION

Figure 1B:
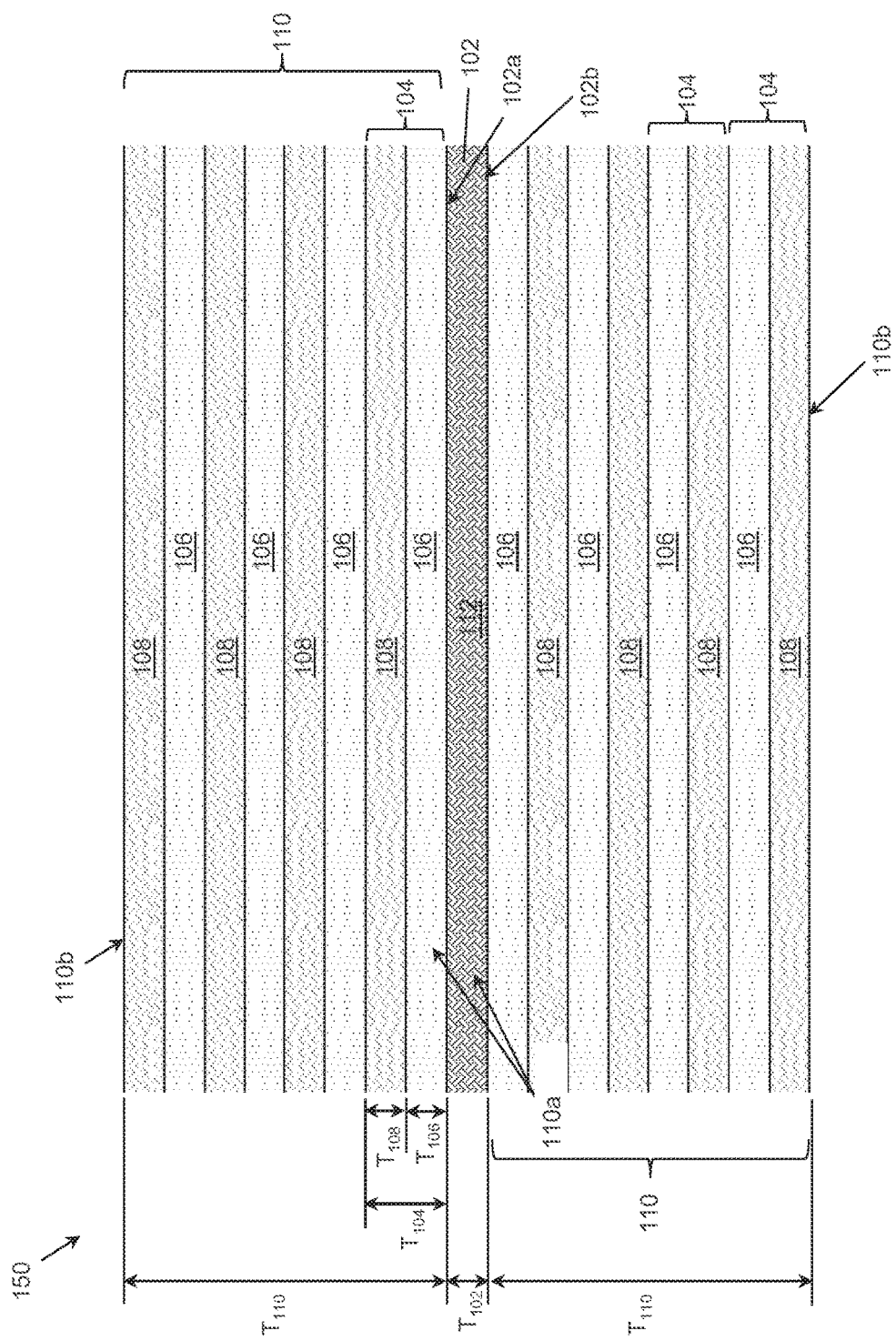
FIG. 1B is a schematic cross-sectional view of a textile including an aspect of a coating in accordance with principles described herein.

Aspects described herein are directed to barriers or coatings, as well as methods for applying such coatings to an underlying substrate. These coatings can be effective in reducing or preventing the adhesion of bacteria to the coated substrates. In some examples, reducing or preventing the adhesion of bacteria to the coated substrates can additionally prevent the substrates from developing unpleasant odors due to the presence of compounds that may otherwise be produced by bacteria, or reduce the level of odor which develops due to the presence of such compounds. In some examples, the coatings function to reduce adhesion of bacteria such as *S. aureus* and *P. aeruginosa* to the substrate, as opposed to actively killing the bacteria, and thus, are less likely to result in the generation of antimicrobial resistant bacteria strains. Such coatings and methods described herein offer the potential for tailoring the properties of the coatings, decreased coating times, and use of the coatings on a variety of substrates including polymers, metals, and ceramics. In general, the substrate surfaces to which the coatings described herein may be applied can be substantially smooth surfaces (e.g., planar) having an average surface roughness of less than 1.0 micron, or textured surfaces (e.g., the surfaces of textiles, foam, etc.) having an average surface roughness greater than or equal to 1.0 micron. In addition, the manufacture and application of aspects of the coatings described herein can be scaled up for mass production. The coatings discussed herein may be applied to a variety of substrates including textiles used to make clothing and linens, which would exhibit reduced accumulation of bacteria that induce residual odor/toxicity.

The effectiveness of the coatings disclosed herein offer the potential for increased durability over time as compared to some conventional approaches for reducing adhesion of bacteria. In addition, examples of the coatings disclosed herein do not substantially alter or diminish the mechanical properties of the underlying substrate. In some aspects, the coating may be described as a polymeric coating that reduces or prevents bacterial adhesion to the surface of a textile (woven or non-woven). In such aspects, the textile is the substrate, and may be illustrated herein in cross-sections that may not reflect the textured nature of the textile's surface(s). In general, the coatings described herein can be applied to a variety of different types of textiles including, without limitation, textiles made of natural and/or man-made fibers, including fibers formed of synthetic polymers. Utilizing readily available chemicals that are applied via solvent free aqueous solutions, a relatively lightweight and safe coating can be achieved using layer-by-layer (LbL) deposition. The coating may be applied in the form of bilayers of cationic polymer(s) and anionic polymer(s), wherein a single bilayer is formed from the combination of a single layer comprising cationic polymer(s) and a single layer comprising anionic polymer(s), so 5 bilayers would comprise 10 layers (5 cationic layers and 5 anionic layers), 3 bilayers would comprise 6 layers (3 cationic layers and 3 anionic layers), and so on. In some aspects, the substrate may be treated with sodium nitrate before the bilayers are applied and/or after the bilayers are applied to oxidize the substrate and potentially enhance adhesion of the coating to the substrate.

Layer-by-layer deposition may be used to apply a coating (i.e., one or more bilayers) with an overall thickness of less than 1 micron to the surfaces of a plurality of fibers in a textile. In one example, the plurality of fibers can be present as yarns forming a knit or woven textile. In another example, the plurality of fibers can be present as entangled fibers forming a non-woven textile. The substrate may be dipped into an aqueous solution including cationic polymer(s), then rinsed with water such as deionized water, then dipped in an aqueous solution including anionic polymers and rinsed again to form a single bilayer. This process may be repeated until a desired number of bilayers are formed. In an aspect, polydiallyldimethylammonium chloride (PDDA) and chitosan (CH) are used as cation polymers and polyacrylic acid (PAA) is used as the anionic polymer. In some aspects, when deposited, a uniform coating is achieved that does not affect the hand (feeling) of the textile. In some aspects, a roll-to-roll process, which may be referred to as "paddling" in the textile industry, may be employed, for example, on a commercial scale. In other aspects, a continuous coater may be used to form the bilayers. The coating may be a rough coating with respect to the smoothness of the surface, since the coating is applied to a three-dimensional surface. As will be described in more detail below, the performance of coatings described herein were quantified with bioluminescent bacteria. In some aspects, using as few as five cationic-anionic bilayers, a coating can be applied that reduces adhesion of bacteria such as S. aureus and P. aeruginosa by at least 95% of deposited bacteria, and using ten cationic-anionic bilayers, a coating can be applied that reduces adhesion of bacteria such as S. aureus and P. aeruginosa by at least 99% of deposited bacteria. Accordingly, such coatings offer potential benefits when applied to textiles used in i apparel and hospital fabrics to inhibit bacterial adhesion. This technology can be easily applied to coat large quantities of textiles for the use in such applications, thereby offering the potential to reduce the transmission and spread of bacterial infections including MRSA, as well as reduce bacterial contamination and odor of soiled garments after vigorous exercise.

The following discussion is directed to various exemplary aspects. However, one skilled in the art will understand that the examples disclosed herein have broad application, and that the discussion of any aspect is meant only to be exemplary of that aspect, and not intended to suggest that the scope of the disclosure, including the claims, is limited to that aspect.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." As used herein, the phrases "consist(s)" of and "consisting of" are used to refer to exclusive components of a composition, meaning only those expressly recited components are included in the composition; whereas the phrases "consist(s) essentially of" and "consisting essentially of" are used to refer to the primary components of a composition, meaning that only small or trace amounts of components other than the expressly recited components (e.g., impurities, byproducts, etc.) may be included in the composition. For example, a composition consisting of X and Y refers to a composition that only includes X and Y, and thus, does not include any other components; and a composition consisting essentially of X and Y refers to a composition that primarily comprises X and Y, but may include small or trace amounts of components other than X and Y. In aspects described herein, any such small or trace amounts of components other than those expressly recited following the phrase "consist(s) essentially of" or "consisting essentially of" preferably represent less than 5.0 weight percent of the composition, more preferably less than 4.0 weight percent of the composition, even more preferably less than 3.0 weight percent of the composition, and still more preferably less than 1.0 weight percent of the composition. The term "Bacterial Adhesion Testing" as used herein refers to the testing methodologies described in the Bacterial Adhesion Testing section below. That testing methodology characterizes the properties of the recited coatings and materials, and are not required to be performed as active steps in the claims.

Referring now to FIG. 1A, an aspect of a textile 100 comprising a coating as described herein is shown. In this aspect, textile 100 includes a substrate 102 and a barrier or coating 110 applied to substrate 102. As used herein, the term "textured" may be used to refer to a surface having a texture characterized by an average surface roughness greater than or equal to 1.0 micron, whereas the term "smooth" may be used to refer to a surface having an average surface roughness less than 1.0 micron. Substrate 102 has a first side or surface 102a, a second side or surface 102b opposite first surface 102a, and a thickness $T_{102}$ measured between surfaces 102a, 102b. In this aspect, surfaces 102a, 102b are generally parallel, and thus, the thickness $T_{102}$ is measured perpendicularly to surfaces 102a, 102b. Substrate 102 comprises a material 112. In general, material 112 can be any textile including, without limitation, textiles made of natural and/or man-made materials such as nylon, polyester, poly(ethyleneterephthalate) (PET), cotton, regenerated cellulose, etc. The natural and/or man-made materials can be present as fibers, including fibers having polymeric cores, as well as blends or combinations thereof. The fibers can be present as loose fibers, as entangled fibers, or as yarns, including monofilament yarns.

Coating 110 is applied to first surface 102a of substrate 102. In particular, coating 110 has an inner side or surface 110a engaging surface 102a of substrate 102, an outer side or surface 110b distal substrate 102, and a thickness $T_{110}$ measured between surfaces 110a, 110b. In this aspect, surfaces 110a, 110b are generally parallel, and thus, the thickness $T_{110}$ is measured perpendicular to surfaces 110a, 110b. In aspects described herein, the thickness $T_{110}$ is less than 1.0 micron. In some aspects, the thickness $T_{110}$ is 10 nm to 50 nm, 20 nm to 100 nm, 100 nm to 250 nm, or other combinations or ranges depending upon the application. When applying coatings to substrates with textured surfaces (e.g., foam or textile), weight gain is typically used in place of thickness. Coatings that are less than one micron in thickness will typically add less than 50 weight percent to the substrate. In one aspect, a preferred weight gain is 0.1 to 10 weight percent, and in another, the preferred weight gain may be 0.5 to 5 weight percent.

Referring still to FIG. 1A, coating 110 is made of a plurality of bilayers 104 disposed one on top of the other between surfaces 110a, 110b. Each bilayer 104 includes a first layer 106 and a second layer 108 disposed on the first layer 106. In addition, each layer 106, 108 has a thickness $T_{106}$, $T_{108}$, respectively, and each bilayer 104 has a thickness $T_{104}$ equal to the sum of the thicknesses $T_{106}$, $T_{108}$ of the corresponding layers 106, 108. Thicknesses $T_{106}$, $T_{108}$, $T_{104}$ are measured perpendicular to surface 110a. In aspects described herein, the thickness $T_{106}$, $T_{108}$ of each layer 106, 108, respectively is from 1.0 to 100.0 nm, or from 1.0 to 10 nm; and the thickness $T_{104}$ of each bilayer 104 is from 1.0 to 100.0 nm or from 1.0 to 10 nm. In general, each layer 106, 108 within a given bilayer 104 may have the same or different thicknesses $T_{106}$, $T_{108}$, respectively, and further, the thickness $T_{104}$ of each bilayer 104 may be the same or different.

In this aspect, each layer 106 is formed of a composition comprising a cationic polymer and each layer 108 is formed of a composition comprising an anionic polymer. As will be described in more detail below, the cationic polymer and anionic polymer of layers 106, 108, respectively, can be applied via aqueous solutions. In aspects described herein, the cationic polymer component of each layer 106 can comprise or consist essentially of polyethyleneimine (PEI), poly(vinyl amine) [PVAm], poly(allyl amine) [PAAm], polydiallyldimethylammonium chloride (PDDA), chitosan (CH), or combinations thereof, and the anionic polymer component of each layer 108 can comprise or consist essentially of poly(acrylic acid) (PAA), poly(styrene sulfonate) [PSS], poly(methacrylic acid) [PMAA], poly(sodium phosphate) [PSP], poly(vinyl sulfate) [PVS] or combinations thereof. In general, bilayers 104 can include the same or different cationic polymers and anionic polymers in layers 106, 108, respectively, within a single coating 110. As used herein, two polymers (cationic polymers or anionic polymers) are considered to be different from one another if one of the polymers includes at least one monomer unit having a chemical structure that differs from the chemical structure of each of the monomeric units of the other polymer. In some aspects, the coating 110 may comprise a single cationic polymer in each layer 106, with the concentration of the cationic polymer varying between bilayers 104. In some cases, this variation may create a concentration gradient that increases in the bilayers 104 moving from inner surface 110a to outer surface 110b. In the aspect of coating 110 shown in FIG. 1A, each layer 106 is made of a combination of polymers consisting essentially of PDDA and CH, and each layer 108 is made of polymers consisting essentially of PAA. Textiles with coatings formed of this combination of polymers can be effective in reducing adhesion of bacteria as compared with identical textiles without such coatings.

In general, the number of bilayers 104 and the thicknesses $T_{106}$, $T_{108}$, $T_{104}$, $T_{110}$ can be selected to achieve a target degree of weight added to substrate 102 by coating 110, a desired degree of coverage of the substrate 102, a desired reduction in bacterial adhesion, or combinations thereof. In aspects described herein, the thicknesses $T_{106}$, $T_{108}$, $T_{104}$, $T_{110}$ are selected to ensure coating 110 adds no more than 5.0 weight percent to substrate 102, or adds from 1.0 weight percent to 5.0 weight percent to substrate 102, or adds less than 2.0 weight percent to substrate 102; the number of bilayers 104 is two or more, or four or more, or six; and the reduction in bacterial adhesion is at least 95% as compared to an uncoated substrate 102, or at least 99% as compared to an uncoated substrate 102. In aspects described herein, the degree of weight added to substrate 102 is expressed as a function of the weight of the uncoated substrate 102. Thus, for example, if a weight of an uncoated substrate is 100 g, then a target weight gain of less than 3.0 weight percent indicates the coated substrate (e.g., substrate 102 plus coating 110) would weigh less than 103 g.

As shown in FIG. 1A, only one surface 102a of substrate 102 is coated with coating 110. However, in other aspects, both surfaces 102a, 102b of substrate 102 are coated with a coating. For example, referring now to FIG. 1B, a textile 150 includes a substrate 102 and coatings 110 applied to both surfaces 102a, 102b. Substrate 102 and each coating 110 is as previously described with respect to FIG. 1A. In particular aspects, the textile 150 including coatings 110 applied to both surfaces 102a, 102b can be effective in reducing bacterial adhesion.

In the aspects shown in FIGS. 1A and 1B, the innermost layer of each coating 110 (i.e., the layer closest to substrate 102 and defining surface(s) 110a) is a layer 106 comprising cationic polymer(s) and the outermost layer of each coating 110 (i.e., the layer furthest from substrate and defining surface(s) 110b) is a layer 108 comprising anionic polymer(s). However, in other aspects, the outermost layer of the coating (e.g., coating 110) is a layer comprising cationic polymer(s) (e.g., layer 106). In such aspects, the innermost layer of the coating can comprise the cationic polymer(s) (e.g., layer 106), and an additional, single layer comprising cationic polymer(s) (half of a bilayer 104) provided as the outermost layer.

Figure 2A:
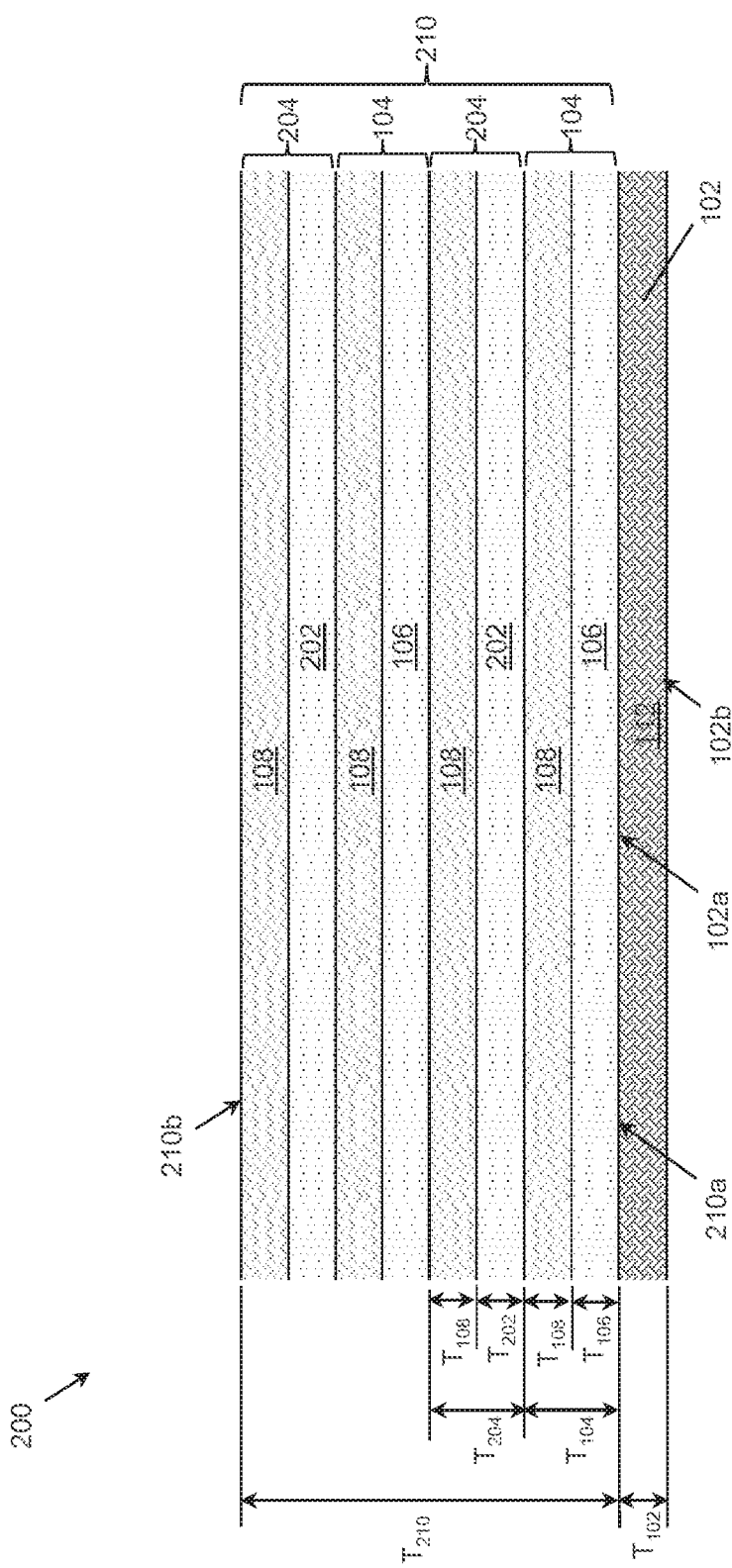
FIGS. 2A and 2B are schematic cross-sectional views of textiles including aspects of coatings in accordance with the principles described herein.

Referring now to FIG. 2A, an aspect of a textile 200 with a coating as described herein, including a coating conferring reduced bacterial adhesion on the substrate is shown. In this aspect, textile 200 includes a substrate 102 as previously described and a coating 210 applied to substrate 102. In this aspect, coating 210 is only applied to one surface 102a of substrate 102, however, in other aspects, a coating 210 is applied to both surfaces 102a, 102b of substrate 102.

Coating 210 has an inner side or surface 210a, an outer side or surface 210b, and a thickness $T_{210}$ measured between surfaces 210a, 210b. In this aspect, surfaces 210a, 210b are generally parallel, and thus, the thickness $T_{210}$ is measured perpendicular to surfaces 210a, 210b. In aspects described herein, the thickness $T_{210}$ is less than 1.0 micron. In some aspects, the thickness $T_{210}$ is 10 nm to 50 nm, 20 nm to 100 nm, 100 nm to 250 nm, or other combinations or ranges depending upon the application. In aspects described herein, the thickness $T_{210}$ is less than 1.0 micron. In some aspects, the thickness $T_{210}$ is 10 nm to 50 nm, 20 nm to 100 nm, 100 nm to 250 nm, or other combinations or ranges depending upon the application. When applying coatings to substrates with textured surfaces (e.g., foam or textile), weight gain is typically used in place of thickness.

Referring still to FIG. 2A, coating 210 is made of a plurality of bilayers 104, 204 disposed one on top of the other between surfaces 210a, 210b. Each bilayer 104 is as previously described. Namely, each bilayer 104 includes a first layer 106 having a thickness $T_{106}$ and being made of a composition comprising cationic polymer(s) and a second layer 108 having a thickness $T_{108}$ and being made of a composition comprising anionic polymer(s). In addition, each bilayer 104 has a thickness $T_{104}$ equal to the sum of the thicknesses $T_{106}$, $T_{108}$ of the corresponding layers 106, 108. Thicknesses $T_{106}$, $T_{108}$, $T_{104}$ are measured perpendicular to surface 210a. Similarly, each bilayer 204 includes a first layer 206 having a thickness $T_{206}$ and being made of a composition comprising cationic polymer(s) and a second layer 108 having a thickness $T_{108}$ and being made of a composition comprising anionic polymer(s). In addition, each bilayer 204 has a thickness $T_{204}$ equal to the sum of the thicknesses $T_{202}$, $T_{108}$ of the corresponding layers 202, 108. Thicknesses $T_{106}$, $T_{108}$, $T_{202}$, $T_{104}$, $T_{204}$ are measured perpendicular to surface 210a.

Bilayers 204 are the same as bilayers 104 with the exception that layer 106 made of the composition comprising cationic polymer(s) is replaced with layer 202 made of a composition comprising different cationic polymer(s). The cationic polymer(s) of each layer 106, 202 (i.e., the cationic polymer component of the composition) can comprise or consist essentially of polyethyleneimine (PEI), poly(vinyl amine) [PVAm], poly(allyl amine) [PAAm], polydiallyldimethylammonium chloride (PDDA), chitosan (CH), or combinations thereof, and the anionic polymer(s) of each layer 108 (i.e., the anioinic polymer component of the composition) can comprise or consist essentially of poly(acrylic acid) (PAA), poly(styrene sulfonate) [PSS], poly(methacrylic acid) [PMAA], poly(sodium phosphate) [PSP], poly (vinyl sulfate) [PVS] or combinations thereof.

In aspects described herein, the thickness $T_{106}$, $T_{108}$, $T_{202}$ of each layer 106, 108, 202 respectively is from 1.0 to 100.0 nm, or from 1.0 to 10 nm; and the thickness $T_{104}$ of each bilayer 104 is from 1.0 to 100.0 nm or from 1.0 to 10 nm. In general, each layer 106, 108 within a given bilayer 104 may have the same or different thicknesses $T_{106}$, $T_{108}$, respectively, and further, the thickness $T_{104}$ of each bilayer 104 may be the same or different. In general, each layer 106, 108, 202 within a given bilayer 104, 204 may have the same or different thicknesses $T_{106}$, $T_{108}$, $T_{202}$, respectively, and further, the thickness $T_{104}$, $T_{204}$ of each bilayer 104, 204, respectively, may be the same or different.

In general, the number of bilayers 104, 204 and the thicknesses $T_{106}$, $T_{108}$, $T_{202}$, $T_{104}$, $T_{204}$, $T_{210}$ can be selected to achieve a target degree of weight added to substrate 102 by coating 210, a desired degree of coverage of the substrate 102, a desired reduction in bacterial adhesion, or combinations thereof. In aspects described, thicknesses $T_{106}$, $T_{108}$, $T_{202}$, $T_{104}$, $T_{204}$, $T_{210}$ are selected to ensure coating 210 adds no more than 5.0 weight percent to substrate 102, or adds from 1.0 weight percent to 5.0 weight percent to substrate 102, or adds less than 2.0 weight percent to substrate 102; the number of bilayers 104, 204 is two or more, or four or more, or six; and the reduction in bacterial adhesion is at least 95 percent as compared to an uncoated substrate 102, or at least 99 percent as compared to an uncoated substrate 102.

Figure 2B:
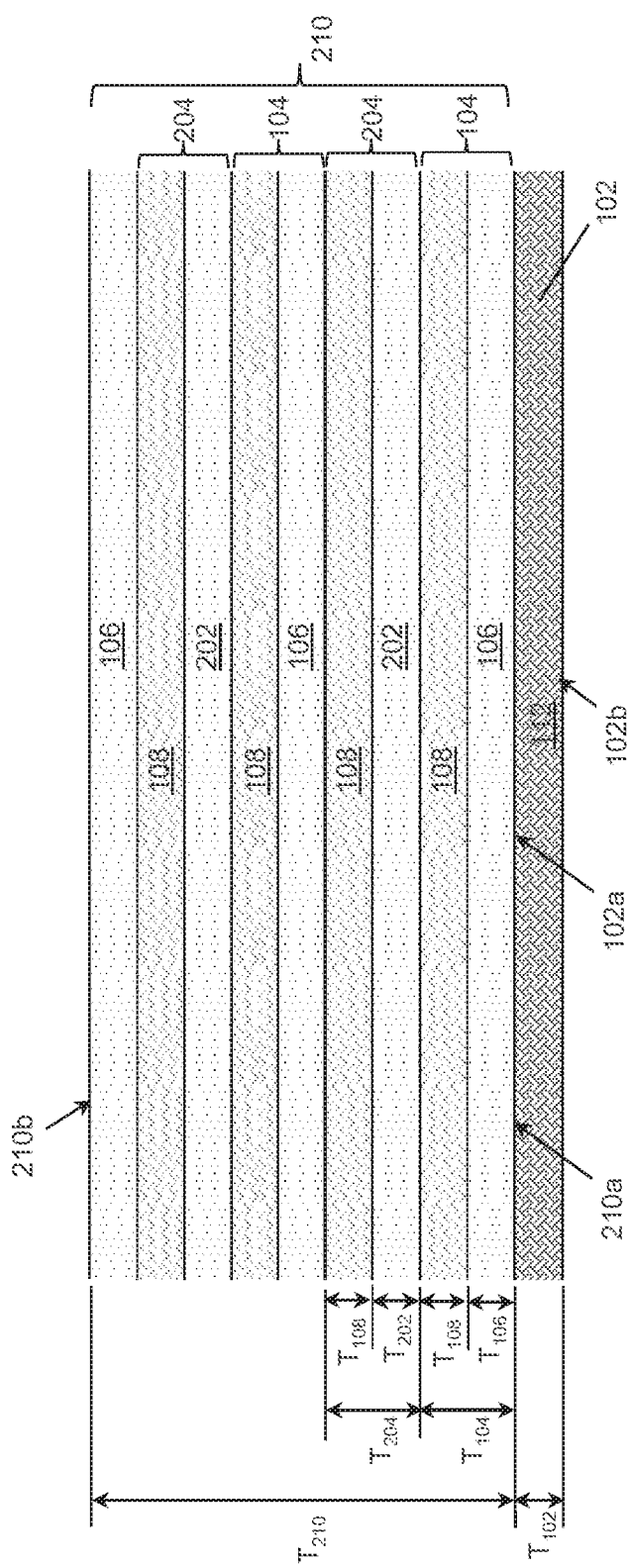

In the aspects shown in FIG. 2A, the innermost layer of each coating 210 (i.e., the layer closest to substrate 102 and defining surface(s) 210a) is a layer 106 comprising cationic polymer(s) and the outermost layer of each coating 210 (i.e., the layer furthest from substrate and defining surface(s) 210b) is a layer 108 comprising anionic polymer(s). However, as shown in FIG. 2B, in other aspects, the outermost layer of the coating (e.g., coating 210) is a layer comprising cationic polymer(s) (e.g., layer 106). In such aspects, the innermost layer of the coating can comprise cationic polymer(s) (e.g., layer 106), and an additional, single layer comprising cationic polymer(s) (half of a bilayer 104) provided as the outermost layer.

In the aspects of coatings 110, 210 previously described, the coating is applied directly to the surface 102a and/or surface 102b of substrate 102. However, in other aspects, a primer or pretreatment layer of sodium nitrate is applied to substrate 102 before coating 110, 210 is applied. Thus, in such aspects, the pretreatment layer of sodium nitrate is positioned between substrate 102 and the coating 110, 210. The pretreatment layer of sodium nitrate, if included, oxidizes the underlying substrate 102 and may enhance adhesion of the coating 110, 210. In addition, the optional pretreatment layer of sodium nitrate, if included, adds negligible weight to substrate 102.

Figure 3:
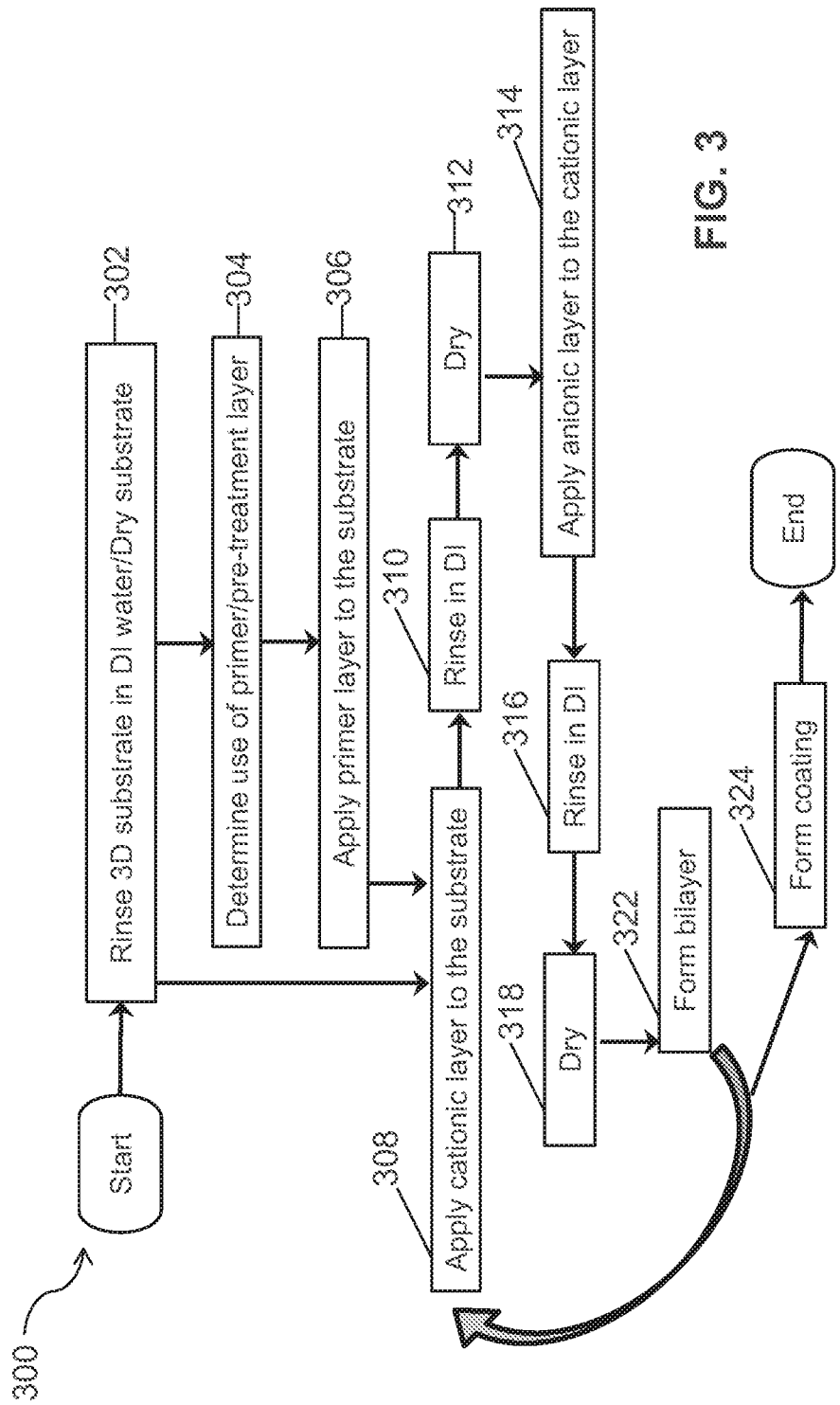
FIG. 3 is a flow chart illustrating an aspect of a method in accordance with principles described herein for applying coatings to substrates.

Referring now to FIG. 3, an aspect of a method 300 for manufacturing a textile (e.g., textile 100, 150, 200) is shown. The textile manufactured in accordance with this method can be effective in reducing bacterial adhesion. Beginning at block 302, substrate 102 as previously described is rinsed in deionized water and dried (e.g., in ambient air, under heated air, under cooled air, or combinations thereof). At block 304, a determination is made as to whether a primer or pre-treatment layer of sodium nitrate is desired, and if so, at block 306, the pre-treatment layer of sodium nitrate is applied to the substrate 102 by dipping, spraying, roll-to-roll, or other application process. As previously described, the pretreatment layer of sodium nitrate, when included, oxidizes the underlying substrate 102 and may enhance adhesion of the subsequently applied coating, and further, adds negligible weight to the substrate.

Regardless of whether or not a primer layer is applied at block 306, formation of the coating begins at block 308 by applying a composition comprising cationic polymer(s) to substrate 102 to form innermost layer 106. In general, the cationic polymer composition can be applied to substrate 102 at block 308 by a dipping, spraying, roll-to-roll, or other application process. In this aspect, the layer of cationic polymer(s) is applied by forming an aqueous solution of one or more cationic polymers, and then applying the aqueous solution to substrate 102. The cationic polymer aqueous solution can comprise water and the cationic polymer(s). In some aspects, the cationic polymer solution consists essentially of water and one or more cationic polymer(s). Accordingly, the cationic polymer aqueous solution is substantially free or completely free of organic solvent(s). In one aspect, the cationic polymer component of the cationic polymer aqueous solution consists essentially of the cationic polymer PAA. The cationic polymer component of the cationic polymer aqueous solution can be dissolved in water at a concentration of about 0.01 to 30 weight percent, or 0.2 to 2 weight percent. After applying the cationic polymer aqueous solution to substrate 102, the substrate with the cationic polymer aqueous solution applied thereto is rinsed in deionized water at block 310 and then dried at block 312 to form layer 106 on substrate 102. In general, the drying in block 312 can be performed in ambient air, or via exposure to heated or cooled air. In one aspect, the cationic polymer aqueous solution is applied to substrate 102 at block 308 by dipping the substrate 102 in the cationic polymer aqueous solution for about 1-7 minutes (e.g., about 5 minutes), followed by a one minute water rinse in block 310, and subsequent dry in ambient air at block 312.

Moving now to block 314, a layer 108, 202 of a composition comprising one or more anionic polymer(s) is applied to layer 106 to form the first bilayer 104, 204 in block 314. In general, the composition comprising the anionic polymer(s) can be applied at block 314 by a dipping, spraying, roll-to-roll, or other application process. In this aspect, the composition comprising the anionic polymer(s) is applied by forming an anionic polymer aqueous solution, and then applying the anionic polymer aqueous solution to substrate 102 and layer 106 thereon. The anionic polymer aqueous solution comprises water and one or more anionic polymer(s). In certain aspects, the anionic polymer aqueous solution consists essentially of water and one or more anionic polymer(s). Accordingly, the anionic polymer aqueous solution is substantially free or completely free of organic solvent(s). In one aspect, the anionic polymer component of the anionic polymer aqueous solution consists essentially of polyethyleneimine (PEI), polydiallyldimethylammonium chloride (PDDA), chitosan (CH), or combinations. The anionic polymeric component of the anionic polymer aqueous solution can be dissolved in an aqueous solution at a concentration of 0.01 to 30 weight percent, or 0.01 to 10 weight percent, or 0.1 to 2 weight percent. After applying the anionic polymer aqueous solution to substrate 102 and layer 106 thereon, the substrate 102 is rinsed in deionized water at block 316 and then dried at block 318, resulting in the formation of bilayer 104, 204 in block 322. In general, rinsing and drying in blocks 316, 318 can be performed in the same manner as rinsing and drying in blocks 310, 312 previously described.

In the manner described, one bilayer 104, 204 is formed on substrate 102. Blocks 308, 310, 312, 314, 316, 318 can be repeated to add additional bilayers 104, 204 to the substrate 102 to form coating 110, 210 at block 324. In some aspects, an outermost layer comprising the cationic polymer(s) may be applied after a final bilayer 104, 204 is formed at block 322, as shown in least FIG. 2B.

In some aspects, each bilayer of the plurality of bilayers comprises the same anionic polymer(s) and cationic polymer(s), and is an equivalent thickness as compared to the other bilayers. In other aspects, some bilayers of the plurality of bilayers formed at block 322 may comprise different anionic polymer(s) and/or cationic polymer(s), and/or be of varying thicknesses as compared to other bilayers of the same or differing compositions. Alternatively or additionally, the layers or bilayers can differ based on the weight percent of the anionic polymer(s) and the cationic polymer(s To further illustrate various illustrative aspects of the present invention, the following examples are provided.

Experiments

The reduction in adhesion of bacteria to aspects of coatings described herein were analyzed and quantified by bacterial loss analysis. In particular, the bacterial loss was quantified by imaging textile samples that were spotted with various concentrations of bacterial solution. The textile was then washed with water and reimaged. Radiance was measured to quantify the bioluminescence, and the direct relationship to viable bacterial colony forming units on the textile was used to quantify the loss. In this way, the bacterial colony forming units were compared before and after washing. As will be described in more detail below, using this technique, it was determined that more than 95 percent of the bacteria were removed from coated textile in contrast to only about 50 percent that were removed from uncoated polyester textile.

The samples were evaluated using bioluminescence, which may overcome the challenges of other techniques that may not be viable or accurate for substrates having more highly textured surfaces and provides a fast and easy method to quantify bacterial concentration on textured surfaces. As discussed herein, the efficacy of a polyelectrolyte multilayer coating of PDDA and PAA on polyester textile was evaluated.

Materials.

PDDA (MW=100,000 g/mol, 20 weight percent solution) and PAA (MW=100,000 g/mol, 35 weight percent aqueous solution) were purchased from Sigma-Aldrich of Milwaukee, Wis., USA. All chemicals were used as received. Ultrapure deionized water filtered using a water filtration system from Milli-Q of Billerica, Mass., USA having a specific resistance greater than 18 megaohms was used in all aqueous solutions and rinses.

Substrates and Assembly of Polyelectrolyte Multilayers.

Single-side-polished, 500 micron thick silicon (Si) wafers from University Wafer of South Boston, Mass., USA, were used as deposition substrates for ellipseometry and atomic force microscopy (AFM). The Si wafers were rinsed with deionized water and methanol, and plasma treated under atmosphere for 10 minutes using plasma cleaner model PDC-32G from Harrick Plasma, Inc. of Ithaca, N.Y., USA. Additionally, thin strips of 7 mil thick poly(ethyleneterapthalate) (PET) from Tekra of New Berlin, Wis., USA were rinsed with deionized water and methanol. The PET surface was imparted with a negative charge using a BD-20 corona treater from Electro-Teching, Inc. of Chicago, Ill., USA. Polyester 720H supplied by Test Fabrics Inc. of West Pittston, Pa., USA was washed with deionized water thoroughly and dried at 70° C. prior to use.

Layer-by-layer (LbL) deposition on two dimensional surfaces (using Si wafers and PET strips as substrates) was carried out using an in-house built robotic coater. The substrate was first immersed in a 0.2 weight percent PDDA aqueous solution for 5 min, rinsed with deionized water, then blown dry with compressed air. This procedure was followed by an identical dipping, rinsing, and drying procedure in 0.2 weight percent PAA aqueous solution, resulting in one bilayer of PDDA/PAA. Following the deposition of the initial bilayer, immersion times were reduced to 1 minute. To ensure the best possible surface coverage of the polymers, a longer immersion time (5 min.) was employed for the initial bilayer.

Layer-by-layer (LbL) deposition on textile samples was carried out via a 5 minute immersion in 0.2 weight percent PDDA aqueous solution followed by rinsing in deionized water and wringing out, and then a 5 minute immersion in a 0.2 weight percent PAA aqueous solution followed by rinsing in deionized water and wringing out, thereby resulting in 1 bilayer of PDDA/PAA on the textile. Following the deposition of the initial bilayer on the textile, immersion times were reduced to 1 minute. The coating process was repeated until the desired number of bilayers were deposited, as shown in FIG. 4.

Biological Evaluation

Testing was performed on the samples fabricated according to certain aspects of the present disclosure using bioluminescent *Staphylococcus aureus* (*S. Aureus*) Xen36 and *Pseudomonas aeruginosa* (*P. aeruginosa*) Xen41 available from PerkinElmer of Waltham, Mass., USA. Overnight cultures were grown in Luria-Burtani (LB) media containing either 200 microgram per milliliter of kanamycin for *S. aureus* cultures or 60 microgram per milliliter tetracycline for *P. aeruginosa* cultures, then spun down at a rate of 8000 revolutions per minute and re-suspended in phosphate buffered saline (PBS) and diluted to a concentration of $5\times10^8$ colony forming units per milliliter (CFU/mL). Two-fold dilutions were then prepared in PBS to test a range of bacterial concentrations for bacterial adherence. Circular swatches of 8.5 cm diameter textile with the PDDA/PAA at 2, 4, 6, 8, and 10 bilayers and an uncoated "control" swatch of textile were sterilized with 70% ethanol for 15 minutes, and the textiles were then rinsed with sterile water and allowed to dry for approximately 30 minutes in a biological safety cabinet. The textile swatches were then spotted with 10 microliter of each bacterial dilution in triplicate. The textiles were then imaged using an IVIS Lumina II imaging system from PerkinElmer of Waltham, Mass., USA using 1 minute exposure time on a luminescence imaging setting with f-stop 2, field of view 12.8, and binning factor 8. Following imaging, the textile samples were washed together in a 1 liter beaker using 125 milliliters per textile sample for 15 minutes in sterilized water. The wash was decanted off and the textiles were rinsed in 100 milliliters of sterilized water. This wash procedure was repeated one additional time. The textile was then placed on an LB agar plate containing either 200 micrograms per milliliter of kanamycin or 60 micrograms per milliliter of tetracycline for *S. aureus* and *P. aeruginosa*, respectively. The plated textile samples were imaged again to determine the amount of bacteria lost following washing. To determine the ability of the bacteria to regrow on each textile, the textile swatches were then incubated at 37 degrees C. and reimaged hourly for 3 hours. To assess the bactericidal versus anti-adhesion properties of PDDA/PAA coated textile, samples were spotted with 10 microliters of a $5\times10^8$ colony forming units per milliliter (CFU/ml) aliquot of *S. aureus*, and imaged to quantify radiance. The textile swatches were then washed individually in 125 milliliters of PBS for 15 minutes with a magnetic stir plate. Next, the textile swatches were imaged to determine the amount of bacteria removed using bioluminescence. Wash water for each sample underwent three 10 fold dilutions, which were all spotted on an LB agar plate coating 200 micrograms per milliliter of kanamycin. Bacterial colonies were counted to determine the amount to viable bacteria in the wash water.

Characterization of Coatings

Thicknesses of aspects of coatings described herein were evaluated using a α-SE ellipsometer available from J. A. Woolam Co. of Lincoln, Nebr., USA. Surface roughnesses of aspects of coatings described herein were characterized using a Dimension Icon atomic force micrometer available from Bruker Corp. of Billerica, Mass., USA via tapping mode experiments. Surface wettability of aspects of coatings described herein were evaluated on 7 mil PET film using a KSV NIMA CAM 200 goniometer optical contact angle and surface tension meter available from Biolin Scientific USA, Paramaus, N.J., USA via static contact angle experiments. Weight gains resulting from the application of aspects of coatings described herein were evaluated on a PET textile (33 by 33 centimeter sheets of Polyester 720 H), which was weighed dry before and after coating to measure the change in mass of the textiles due to the coatings.

Coating Growth.

Coatings comprising PDDA/PAA bilayers were applied in 2 bilayer intervals on Si wafers for thickness and roughness evaluation. In addition, coatings comprising PDDA/PAA bilayers were applied on the PET film to measure surface contact angle for surface wettability evaluation, and coatings comprising PDDA/PAA bilayers were applied to the PET textiles for evaluation of weight gain and bacterial adhesion resistance. The coating thicknesses and contact angles were measured as described above (using a using an alpha-SE ellipsometer from J. A. Woollam of Lincoln, Nebr., USA and a KSV CAM 200 contact angle goniometer from KSV Instruments Ltd, Trumbull, Conn., USA. Bacterial adhesion was measured using a Biological Adhesion Test described in more detail below.

Figure 5:
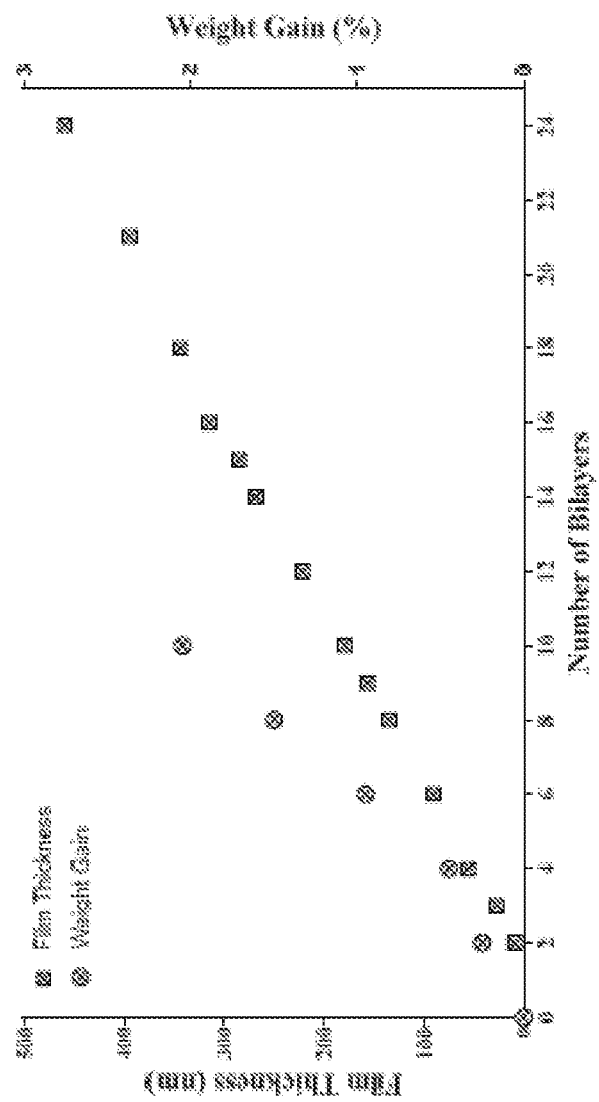
FIG. 5 is a graph illustrating the coating thickness and coating weight as a function of the number of coating bilayers for aspects of coatings described herein.

FIG. 5 illustrates the coating thickness and weight gain as a function of the number of bilayers. As shown in FIG. 5, the coatings generally grew in a linear fashion indicating uniform thickness per bilayer and suggesting minimal interdiffusion between PDDA and PAA during growth. As also illustrated in FIG. 5, the weight gain on the textile resulting from the coatings exhibited two different linear growth regions—a first linear growth region for up to 4 bilayers and a second, faster linear growth region for more than 4 bilayers. Without being limited by this or any particular theory, the initial deposition of the first bilayer on the PET textile relies on van der Waals forces between the PDDA and the PET substrate, which has a neutral surface charge. Van der Waals forces are much weaker than electrostatic forces between the positively charged quaternary amine of PDDA and the negatively charged Si substrate. As a result, less PDDA is deposited initially on the PET substrate leading to less surface coverage per deposition cycle, but once a consistent base of polyelectrolytes are deposited, at 4 bilayers, the electrostatic forces become dominant, contributing to the higher but linear growth rate observed.

TABLE 1

Summary of surface analysis

| Bilayers | Thickness (nm) | Roughness (nm) | Contact Angle (°) |
| --- | --- | --- | --- |
| 0 | N/A | 1.24 | 71 ± 2 |
| 2 | 9.4 ± 0.3 | 3.98 | 46 ± 3 |
| 4 | 56.0 ± 0.7 | 10.5 | 28 ± 1 |
| 10 | 179.3 ± 0.5 | 16.1 | 20 ± 1 |

Table 1 above illustrates the measured thicknesses and roughnesses of the PDDA/PAA bilayer coatings as deposited on the Si wafers, and the measured contact angles of the PDDA/PAA bilayer coatings deposited on the 7 mil PET film. The contact angle images for coatings comprising 0, 2, 4, and 10 PDDA/PAA bilayers are illustrated in the inset images of FIGS. 6A-6D, respectively.

Atomic Force Microscopy

Figures 6A, 6B, 6C, 6D:
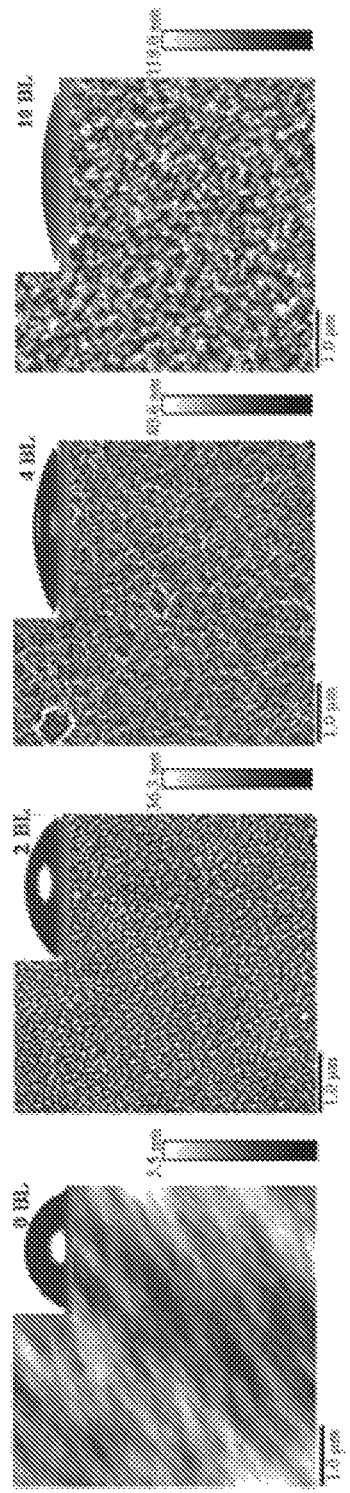
FIGS. 6A-6D are atomic force microscopy (AFM) images of aspects of 0, 2, 4, and 10 bilayer coatings of PDDA/PAA, respectively, deposited on silicon wafers.

FIGS. 6A-6D illustrate the results of atomic force microscopy (AFM) for determining surface roughnesses. In particular, the PDDA/PAA bilayer coatings deposited on the Si wafers were imaged using AFM to evaluate surface roughness as a function of the number of bilayers. The uncoated Si wafers had an average roughness of 1.24 nm. In particular, FIG. 6A illustrates an AFM image of an Si wafer with no bilayers, FIG. 6B illustrates an AFM image of an Si wafer with 2 bilayers applied, FIG. 6C illustrates an AFM image of an Si wafer with 4 bilayers applied, FIG. 6D illustrates an AFM image of an Si wafer with 10 bilayers applied. As shown in FIG. 6B, 2 bilayers results in island like domains scattered across the surface of the Si wafer. Uncoated Si was observed, indicating complete coverage of the substrate was not achieved. The roughness increased to approximately 4 nm. Moving now to FIG. 6C, at 4 bilayers, incomplete coverage was still observed (bare Si substrate or minimally coated Si substrate). One such pore can be seen highlighted in FIG. 6C. The depth of the pore was estimated to be 40-50 nm, which is of similar magnitude to the 56 nm measured thickness of the coating. The measured surface roughness of the 4 bilayer coating was 10.5 nm. As shown in FIG. 6D, at 10 bilayers, the pores observed at 4 bilayers (FIG. 6C) were non-existent. The measured surface roughness of the 10 bilayer coating was 16.1 nm.

Contact Angle

Static contact angle measurements were taken to evaluate the hydrophobicity of the 7 mil PET films coated with different numbers of PDDA/PAA bilayers. The contact angle images for 0, 2, 4, and 10 PDDA/PAA bilayer coatings are shown in the inserts of FIGS. 6A-6D. Contact angle measurements using Young's model can be given by Equation 1 as follows:

$$\cos\theta = \frac{\gamma sv - \gamma sl}{\gamma lv} \quad \text{(Eq. 1)}$$

Where theta (θ) is the measured contact angle, γsv is the interfacial surface tension between the surface and vapor, γsl is the interfacial surface tension between the surface and liquid drop, and γlv is the interfacial surface tension between liquid and vapor. Using this information, surface energy trends can be estimated, based on the understanding that decreasing contact angles measured with water, hydrophilicity increases along with surface energy. The uncoated PET film exhibited a contact angle of 71±2 degrees, while a PET film coated with 2 bilayers of PDDA/PAA exhibited a contact angle of 46±3 degrees (a 35 percent decrease in the contact angle for 2 bilayers as compared to uncoated). The PET film coated with 4 bilayers of PDDA/PAA exhibited a contact angle of 28±1 degrees (a 39 percent decrease in the contact angle as compared to 2 bilayers and a 61 percent decrease in contact angle as compared to uncoated). The PET film coated with 10 bilayers exhibited a contact angle of 20±1 degrees (a 28 percent decrease in contact angle as compared to 4 bilayers and a 72 percent decrease in contact angle as compared to uncoated).

Bacterial Adhesion Testing

Testing was used to visualize and quantitatively measure bacterial populations on aspects of coatings described herein before and after washing coated textiles with sterile water. In some aspects of coatings discussed herein, the coatings were effective in reducing and/or eliminating accumulation of bacteria on the underlying substrate. In one test, samples of polyester fabric were coated with different numbers of PDDA/PAA bilayers, and a bioluminescent strain of S. aureus containing an integrated copy of the luxABCDE operon from Photorhabdus luminescens was used to visualize and quantitatively measure bacterial populations on the coated samples of fabric both before and after washing with sterile water. In particular, to get a better sense of the impact of the coatings on the adhesion of bacteria, the data was quantified to illustrate the quantity of bacteria removed from the surface of the coated fabric samples after washing with sterile water. This data was quantified using Living Image software from Perkin Elmer and correlated to bacterial colony forming units (CFU) per area. Using a standard curve generated from 10-fold dilutions of bioluminescent S. aureus Xen36, the CFUs were calculated for each spot on the fabric samples. The CFUs were calculated for the most concentrated spots on the fabric (shown in the top "Prewash" row in FIGS. 7A-7F). The data is summarized in Table 2 below, which illustrates a steady decrease in the amount of S. aureus detected before and after washing with sterile water.

TABLE 2

Colony forming units (CFU) detected before and after washing, as a function of bilayers.

| Bilayers | Before Wash (CFU) | After Wash (CFU) |
| --- | --- | --- |
| Uncoated | 70400 ± 11400 | 33000 ± 2300 |
| 2 | 71100 ± 800 | 23400 ± 2300 |
| 4 | 80400 ± 3200 | 13600 ± 500 |
| 6 | 74700 ± 6300 | 5100 ± 300 |
| 8 | 69600 ± 1900 | 1400 ± 60 |
| 10 | 66400 ± 1300 | 811 ± 40 |

As shown in Table 2 above, at 6 bilayers, an order of magnitude difference in the amount of bacteria detected was observed. At 10 bilayers, the amount of bacteria detected was 2 orders of magnitude less than uncoated fabric. The results of all trials were combined based on percent reduction of bacteria via washing. In general, as the number of bilayers of PDDA/PAA increased, the amount of bacteria removed by washing increased—(PDDA/PAA)$_0$ (50 percent reduction in bacteria)<(PDDA/PAA)$_2$ (63% reduction in bacteria)<(PDDA/PAA)$_4$ (82 percent reduction in bacteria) <(PDDA/PAA)$_6$ (92 percent reduction in bacteria)<(PDDA/PAA)$_8$ (98 percent reduction in bacteria)<(PDDA/PAA)$_{10}$ (99 percent reduction in bacteria).

Results of the Biological Adhesion Testing are visually illustrated in FIGS. 7A-7F. In particular, FIGS. 7A-7F are bioluminescent images of the results of Biological Adhesion Testing for an uncoated sample of polyester fabric (FIG. 7A) and samples of polyester fabric coated with different numbers of PDDA/PAA bilayers (FIGS. 7B-7F) as tested with S. aureus bacteria. The top row (pre-wash) of FIGS. 7A-7F are polyester fabric samples tested according to the Biological Adhesion Testing with S. aureus freshly applied, and the bottom row (post-wash) of FIGS. 7A-7F are the same fabric samples as the top row after being washed with sterilized water. FIG. 7A is an image of a fabric sample with no coating (0 bilayers), FIG. 7B shows a fabric sample comprising 2 PDDA/PAA bilayers, FIG. 7C shows a fabric sample comprising 4 PDDA/PAA bilayers, FIG. 7D shows a fabric sample comprising 6 PDDA/PAA bilayers, FIG. 7E shows a fabric sample comprising 8 PDDA/PAA bilayers, and FIG. 7F shows a fabric sample comprising 10 PDDA/PAA bilayers.

The colorful spots in FIGS. 7A-7F indicate luminescence from viable S. aureus bacteria, with bright/warmer colors and larger spots representing more bacteria present on the fabric samples. In particular, the radiance index indicates bacteria viability, with a higher radiance value being associated with more viable bacteria present on the fabric sample. When the fabric samples were rinsed with sterilized water, the intensity of the spots was reduced with the degree of reduction generally depending on the number of PDDA/

PAA bilayers. In particular, a decreasing amount of bioluminescence was seen post-wash with an increasing number of PDDA/PAA bilayers. The rows of spots in each of FIGS. 7A-7F pre-wash are made of the same bacterial concentrations, and the columns consist of spots with bacterial concentrations decreasing by about 50 percent per row.

Figure 8:
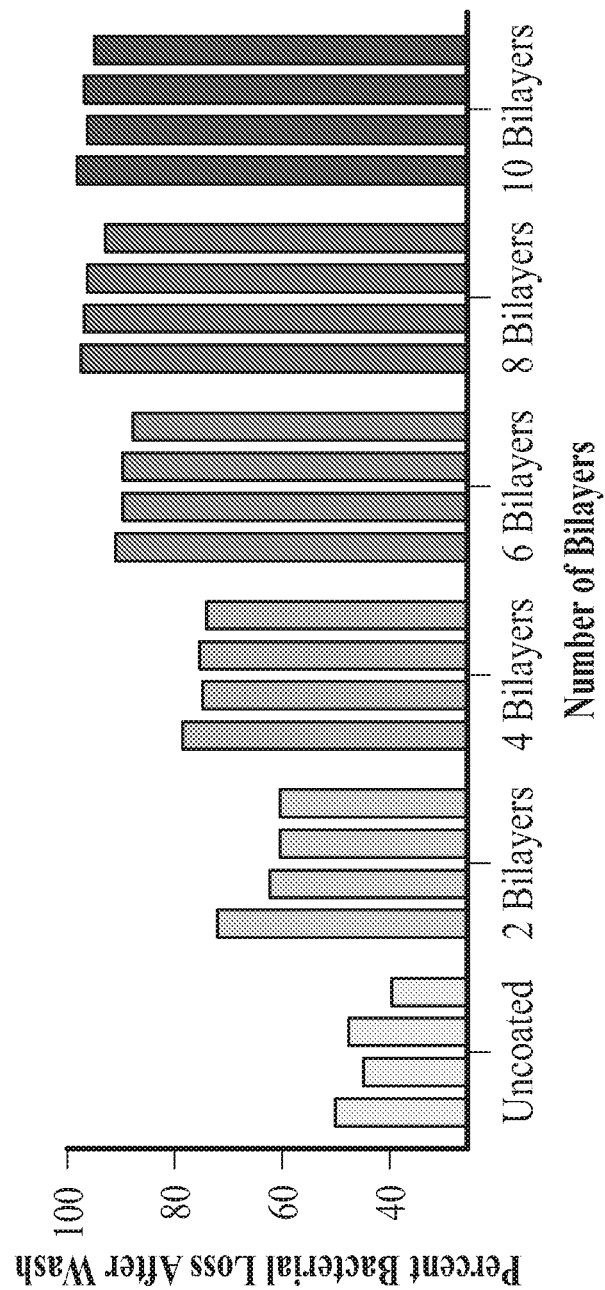
FIG. 8 is a bar graph illustrating the percent loss of bacteria after washing as a function of the number of bilayers in coatings in accordance with principles described herein.

FIG. 8 is a graph illustrating the percent loss of bacterial as a function of the number of PDDA/PAA bilayers after washing according to the Bacterial Adhesion Testing described above. As shown in FIG. 8, increasing the number of PDDA/PAA bilayers increases the efficacy of washing the fabric sample with sterilized water, and at 8 and 10 bilayers the vast majority of S. aureus was removed by the washing step. It should be appreciated that a larger percent of bacteria were removed by washing the fabric samples with more PDDA/PAA bilayers, such that the polyester fabric sample coated with 10 PDDA/PAA bilayers was close to 100 percent free (99.99 percent) of bacteria after washing.

The 10 PDDA/PAA bilayer sample of FIG. 8 constituted a 180 nm thick coating that did not have any observable adverse effects to the feel (texture/surface roughness) of the textile, which is a desirable result for textiles used in both athletic and medical environments.

Bactericidal Versus Anti Adhesion.

Figure 9B:
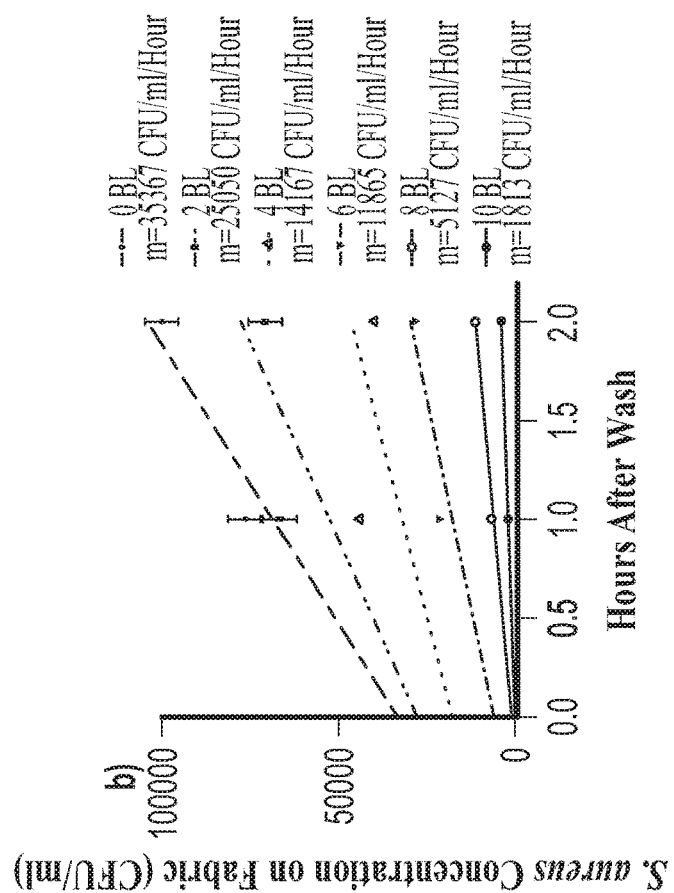
FIG. 9B is a graph illustrating the concentration of the regrowth of *S. aureus* bacteria on the textiles of FIG. 9A as a function of time.
Figure 9A:
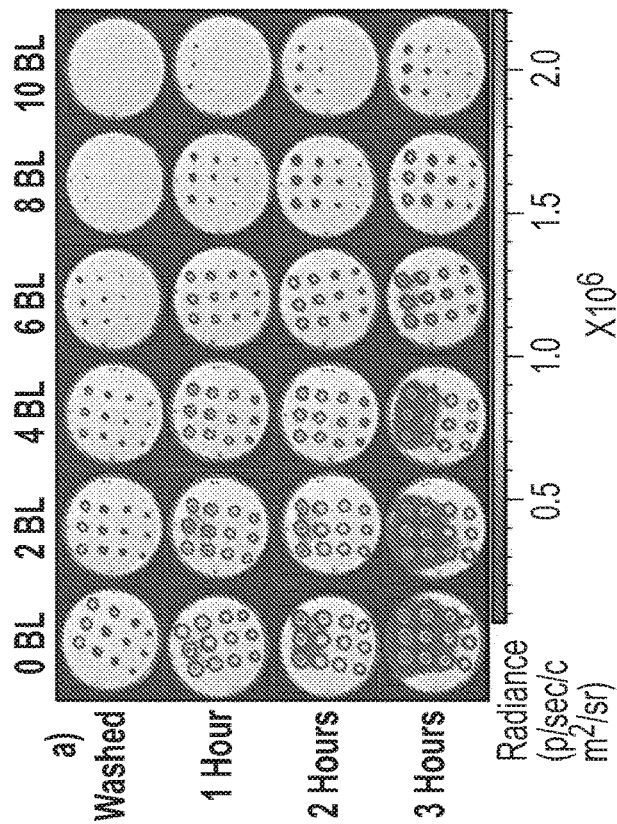
FIG. 9A illustrates bioluminescent images of the regrowth of *S. aureus* bacteria on textiles after washing.

FIGS. 9A and 9B illustrate bioluminescent images of regrowth of S. aureus on the textile after washing according to Biological Adhesion Testing. The same polyester fabric samples illustrated in FIGS. 7A-7F were put onto a nutrient rich agar plate and placed in the oven at 37 degrees C. The textile was then imaged hourly for the next three hours using the IVIS. From FIG. 9A, it is seen that the increase in radius and intensity of the spots was indicative of bacterial regrowth. Over a period of three hours, the bacteria radiated from their central spotting location which was especially evident in the samples with fewer PDDA/PAA bilayers. It was concluded that increased bacterial growth was not a result of random adherence of viable bacteria during washing, but regrowth of viable S. aureus that remained adhered after washing. In examining the raw pictures of the regrowth and plotting bacterial concentration as a function of time after washing, it was clear that the textile with more bilayers of PDDA/PAA created an environment that slowed the bacterial regrowth. By examining the slopes of those plots, a 1 order of magnitude reduction in the rate of regrowth was observed, as illustrated in the graph of FIG. 9B.

Figure 10:
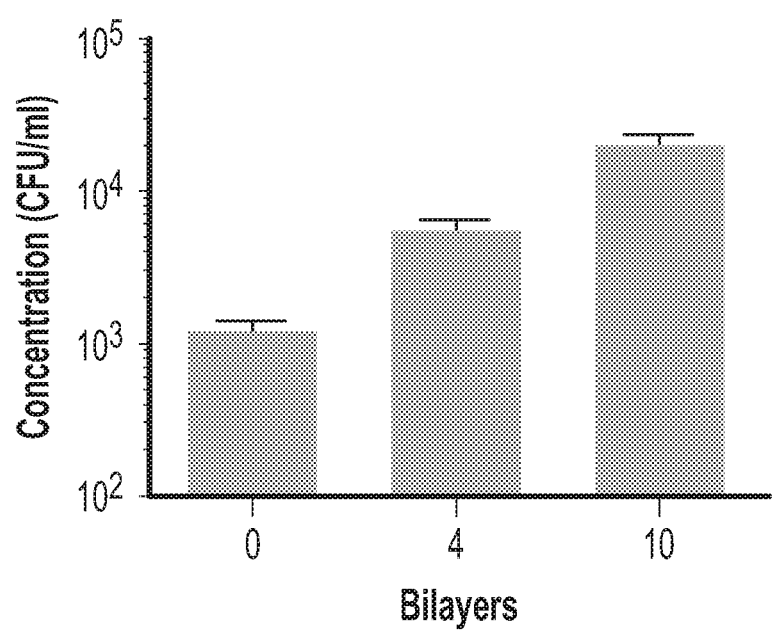
FIG. 10 is a bar graph illustrating the concentration of bacteria in post-wash water as a function of the number of bilayers in coatings in accordance with principles described.

FIG. 10 is a graph of the concentration of bacteria in post-wash water as a function of the number of PDDA/PAA bilayers of the fabric samples washed during the Biological Adhesion Testing. Viable colonies were counted after 24 hours at 37° C. to generate the graph of FIG. 10. As shown in FIG. 10, as the number of bilayers increases, the amount of viable bacteria in the wash water increases by an order of magnitude between 0 and 10 bilayers.

Experiments with P. aeruginosa.

Additional testing in accordance with the Bacterial Adhesion Testing described above were performed with P. aeruginosa, a gram negative bacteria. Note: S. aureus and P. aeruginosa both exhibit negative surface charges at physiological conditions indicating it was unlikely that electrostatic repulsion would be a factor in any lack of observed bacterial adhesion.

Figure 11:
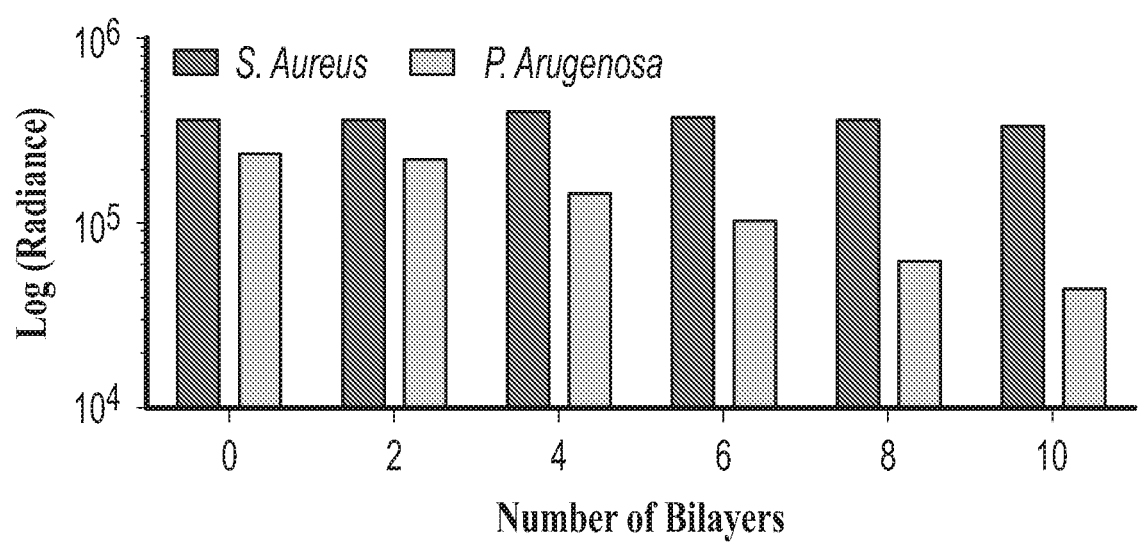
FIG. 11 is a bar graph illustrating the initial adhesion of *S. aureus* and *Pseudomonas aeruginosa* (*P. aeruginosa*) bacteria, before washing, to textiles coated with coatings comprising different numbers of bilayers in accordance with principles described herein.

FIG. 11 illustrates a comparison of initial adhesion of the two different types of bacteria (P. aeruginosa and S. aureus) to coated and uncoated polyester fabric samples before washing. In comparing the initial adhesion across all samples it was observed that the radiance measured obeyed the following trend, $(PDDA/PAA)_{uncoated} > (PDDA/PAA)_2 >$ $(PDDA/PAA)_4 > (PDDA/PAA)_6 > (PDDA/PAA)_8 > (PDDA/PAA)_{10}$. In comparing uncoated textiles to textiles with 10 bilayers of PDDA/PAA, an order of magnitude decrease radiance was observed with P. aeruginosa, indicating that there was a decrease in the amount of adhered bacteria by the same factor. This in stark contrast to the initial adhesion of S. aureus which appeared to remain constant over uncoated and coated samples alike. This contrast can be seen in FIG. 11, and suggests the initial adhesion step was different between the two bacteria.

Having described above various aspects of textiles, devices, and methods, various additional features may include, but are not limited to the following:

In a first aspect, a textile may comprise a substrate, a coating applied to a surface of the substrate. The coating comprises a plurality of bilayers positioned one on top of the other. Each bilayer includes a first layer comprising a cationic polymer and a second layer comprising an anionic polymer. The cationic polymer in the first layer comprises a polyethyleneimine (PEI), a poly(vinyl amine) (PVAm), a poly(allyl amine) (PAAm), a polydiallyldimethylammonium chloride (PDDA), or a chitosan (CH). The anionic polymer in the second layer comprises a poly(acrylic acid) (PAA), a poly(styrene sulfonate) (PSS), a poly(methacrylic acid) (PMAA), a poly(sodium phosphate) (PSP), or a poly(vinyl sulfate) (PVS).

A second aspect can include the textile of the first aspect, wherein the cationic polymer in the first layer comprises a polydiallyldimethylammonium chloride (PDDA) or a chitosan (CH), and wherein the anionic polymer in the second layer comprises a poly(acrylic acid) (PAA).

A third aspect can include the textile of the first or second aspect, further comprising a layer of sodium nitrate positioned between the substrate and the coating.

A fourth aspect can include the textile of any of the first to third aspects, wherein the substrate comprises nylon, cotton, polyester, or combinations thereof.

A fifth aspect can include the textile of any of the first to fourth aspects, wherein the cationic polymer in the first layer of each bilayer comprises CH.

A sixth aspect can include the textile of any of the first to fifth aspects, wherein the cationic polymer in the first layer of each bilayer consists essentially of CH.

A seventh aspect can include the textile of any of the first to sixth aspects, wherein the cationic polymer in the first layer of each bilayer consists of CH.

An eight aspect can include the textile of any of the first to seventh aspects, wherein the cationic polymer in the first layer of one bilayer is different than the cationic polymer in the first layer of another bilayer.

A ninth aspect can include the textile of any of the first to eight aspects, wherein the plurality of bilayers comprises at least four bilayers.

A tenth aspect can include the textile of any of the first to ninth aspects, wherein the substrate has a first surface and the coating is applied to the first surface, and wherein the coating has a thickness Tc measured between an innermost surface of the coating adjacent the first surface of the substrate and an outermost surface of the coating distal the substrate, wherein the thickness Tc is less than 1.0 micron.

A eleventh aspect can include the textile of any of the first to tenth aspects, wherein each bilayer has a thickness Tb from 1 nm to 100 nm.

A twelfth aspect can include the textile of any of the first to eleventh aspects, wherein the substrate has a weight Ws and the substrate has a weight Wc, wherein the weight Wc divided by the weight Ws is less than 0.05.

A thirteenth aspect can include the textile of any of the first to twelfth aspects, wherein the weight Wc divided by the weight Ws is less than 0.02.

A fourteenth aspect can include the textile of any of the first to thirteenth aspects, wherein the substrate comprises a yarn.

A fifteenth aspect can include the textile of any of the first to fourteenth aspects, wherein the substrate comprises a fiber comprising a core formed of a polymeric material surrounded by the plurality of bilayers.

A sixteenth aspect can include the textile of any of the first to fifteenth aspects, wherein the substrate comprises poly(ethyleneterephthalate) (PET) or polyester.

A seventeenth aspect can include the textile of any of the first to sixteenth aspects, wherein the surface of the substrate has an average surface roughness greater than or equal to 1.0 microns.

An eighteenth aspect can include the textile of any of the first to seventeenth aspects, wherein the plurality of bilayers comprises at least five bilayers.

A nineteenth aspect can include the textile of any of the first to eighteenth aspects, wherein the coating reduces the adhesion of S. aureus or P. aeruginosa bacteria by at least 95%, as characterized by the Bacterial Adhesion Testing.

A twentieth aspect can include the textile of any of the first to nineteenth aspects, wherein the plurality of bilayers comprises at least ten bilayers.

A twenty-first aspect can include the textile of any of the first to twentieth aspects, wherein the coating reduces the adhesion of S. aureus or P. aeruginosa bacteria by at least 99%, as characterized by the Bacterial Adhesion Testing.

In a twenty-second aspect, a method for manufacturing a textile comprises (a) applying a first aqueous solution including a cationic polymer to a first surface of a substrate. The cationic polymer in the aqueous solution comprises a polyethyleneimine (PEI), a poly(vinyl amine) (PVAm), a poly(allyl amine) (PAAm), a polydiallyldimethylammonium chloride (PDDA), or a chitosan (CH). The method also comprises (b) forming a first layer of the cationic polymer on the first surface. In addition, the method comprises (c) applying a second aqueous solution including an anionic polymer to the substrate after (b). The anionic polymer comprises a poly(acrylic acid) (PAA), a poly(styrene sulfonate) (PSS), a poly(methacrylic acid) (PMAA), a poly(sodium phosphate) (PSP), or a poly(vinyl sulfate) (PVS). Further, the method comprises (d) forming a second layer of the anionic polymer on the first layer after (c) to form a bilayer on the substrate. Moreover, the method comprises (e) repeating (a) through (d) to form a coating comprising at least four bilayers on the substrate, wherein the coating has a thickness less than 1.0 micron.

A twenty-third aspect can include the method of the twenty-second aspect, wherein the cationic polymer in the first aqueous solution comprises a polydiallyldimethylammonium chloride (PDDA) or a chitosan (CH), and wherein the anionic polymer in the second aqueous solution comprises a poly(acrylic acid) (PAA).

A twenty-fourth aspect can include the method of the twenty-second or twenty-third aspect, wherein (b) comprises (b1) rinsing the substrate after (a), and (b2) drying the substrate after (b1).

A twenty-fifth aspect can include the method of any of the twenty-second to twenty-fourth aspects, wherein (d) comprises (d1) rinsing the substrate after (c), and (d2) drying the substrate after (d1).

A twenty-sixth aspect can include the method of any of the twenty-second to twenty-fifth aspects, wherein the first aqueous solution has a concentration of the cationic polymer from 0.01 to 30 weight percent, and wherein the second aqueous solution has a concentration of the anionic polymer from 0.01 to 30 weight percent.

A twenty-seventh aspect can include the method of any of the twenty-second to twenty-sixth aspects, wherein the substrate is a textile comprising nylon or polyester.

A twenty-eighth aspect can include the method of any of the twenty-second to twenty-seventh aspects, further comprising maintaining a weight of the coating to be less than 3 weight percent of a weight of the substrate.

A twenty-ninth aspect can include the method of any of the twenty-second to twenty-eighth aspects, wherein the first aqueous solution consists essentially of the cationic polymer and water, and wherein the second aqueous solution consists essentially of the anionic polymer and water.

A thirtieth aspect can include the method of any of the twenty-second to twenty-ninth aspects, wherein the first aqueous solution is substantially free of organic solvents and the second aqueous solution is substantially free of organic solvents.

A thirty-first aspect can include the method of any of the twenty-second to thirtieth aspects, wherein the substrate comprises poly(ethyleneterephthalate) (PET) or polyester.

A thirty-second aspect can include the method of any of the twenty-second to thirty-first aspects, wherein the first surface of the substrate has an average surface roughness greater than or equal to 1.0 microns.

A thirty-third aspect can include the method of any of the twenty-second to thirty-second aspects, further comprising reducing the adhesion of deposited S. aureus or P. aeruginosa bacteria by at least 95 percent with at least five bilayers in the coating on the substrate.

A thirty-fourth aspect can include the method of any of the twenty-second to thirty-third aspects, further comprising reducing the adhesion of deposited S. aureus or P. aeruginosa bacteria by at least 99 percent with at least ten bilayers in the coating on the substrate.

In a thirty-fifth aspect, a method for manufacturing a textile comprises (a) applying an aqueous solution comprising a cationic polymer to a substrate. The cationic polymer comprises at least one of a polyethyleneimine (PEI), a poly(vinyl amine) [PVAm], a poly(allyl amine) [PAAm], a polydiallyldimethylammonium chloride (PDDA), and a chitosan (CH). The method also comprises (b) rinsing the substrate after (a). In addition, the method comprises (c) drying the substrate after (b). Further, the method comprises (d) applying an aqueous solution comprising an anionic polymer to the substrate after (a)-(c). Moreover, the method comprises (e) rinsing the substrate after (d). Still further, the method comprises (f) drying the substrate after (e). The method also comprises (g) forming a first bilayer on the substrate, wherein the first bilayer comprises a first layer of the cationic polymer and a second layer of the anionic polymer. In addition, the method comprises (h) repeating (a)-(f) to form at least four bilayers on the substrate, wherein each bilayer comprises a first layer of the cationic polymer and a second layer of the anionic polymer.

A thirty-sixth aspect can include the method of the thirty-fifth aspect, wherein the cationic polymer comprises a polydiallyldimethylammonium chloride (PDDA) or a chitosan (CH).

A thirty-seventh aspect can include the method of the thirty-fifth aspect or the thirty-sixth aspect, further comprising pretreating the substrate with a sodium nitrate primer before (a).

A thirty-eight aspect can include the method of any of the thirty-fifth to thirty-seventh aspects, wherein the coating has a thickness less than 500 nm.

A thirty-ninth aspect can include the method of any of the thirty-fifth to thirty-eighth aspects, wherein the coating has a weight that is less than 3 weight percent of a weight of the substrate after (h).

A fortieth aspect can include the method of any of the thirty-fifth to thirty-ninth aspects, wherein the anionic polymer comprises at least one of a poly(acrylic acid) (PAA), poly(styrene sulfonate) [PSS], a poly(methacrylic acid) [PMAA], a poly(sodium phosphate) [PSP], and a poly(vinyl sulfate) [PVS].

A forty-first aspect can include the method of any of the thirty-fifth to fortieth aspects, wherein the aqueous solution comprising the cationic polymer consists essentially of the cationic polymer and water, and wherein the aqueous solution comprising the anionic polymer consists essentially of the anionic polymer and water.

A forty-second aspect can include the method of any of the thirty-fifth to forty-first aspects, wherein the aqueous solution of the anionic polymer has a concentration of the anionic polymer from 0.01 to 30 weight percent.

A forty-third aspect can include the method of any of the thirty-fifth to forty-second aspects, wherein the aqueous solution comprising the cationic polymer is substantially free of organic solvents and the second aqueous solution comprising the anionic polymer is substantially free of organic solvents.

A forty-fourth aspect can include the method of any of the thirty-fifth to forty-third aspects, wherein the substrate comprises poly(ethyleneterephthalate) (PET) or polyester.

Exemplary aspects are disclosed and variations, combinations, and/or modifications of the aspect(s) and/or features of the aspect(s) made by a person having ordinary skill in the art are within the scope of the disclosure. Alternate aspects that result from combining, integrating, and/or omitting features of the aspect(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as "comprises," "includes," and "having" should be understood to provide support for narrower terms such as "consisting of," "consisting essentially of," and "comprised substantially of." Each and every claim is incorporated into the specification as further disclosure, and the claims are exemplary aspect(s) of the present invention.

While exemplary aspects of the invention have been shown and described, modifications thereof can be made by one skilled in the art without departing from the scope or teachings herein. The aspects described herein are exemplary only and are not limiting. Many variations and modifications of the compositions, systems, apparatus, and processes described herein are possible and are within the scope of the invention. Accordingly, the scope of protection is not limited to the aspects described herein, but is only limited by the claims that follow, the scope of which shall include all equivalents of the subject matter of the claims. Unless expressly stated otherwise, the steps in a method claim may be performed in any order and with any suitable combination of materials and processing conditions.

What is claimed is:

1. A textile, comprising:
   a substrate;
   a coating applied to a surface of the substrate, wherein the coating is effective to reduce or prevent adhesion of bacteria to the substrate without actively killing the bacteria, wherein the coating comprises:
   a plurality of bilayers positioned one on top of the other, wherein each bilayer includes a first layer comprising a cationic polymer and a second layer comprising an anionic polymer;
   wherein the cationic polymer in the first layer comprises a poly(vinyl amine) (PVAm), a poly(allyl amine) (PAAm), or a polydiallyldimethylammonium chloride (PDDA), and wherein the anionic polymer in the second layer comprises a poly(acrylic acid) (PAA), a poly(styrene sulfonate) (PSS), a poly(methacrylic acid) (PMAA), a poly(sodium phosphate) (PSP), or a poly(vinyl sulfate) (PVS); or
   wherein the cationic polymer in the first layer comprises a polyethyleneimine (PEI), a poly(vinyl amine) (PVAm), a poly(allyl amine) (PAAm), a polydiallyldimethylammonium chloride (PDDA), or a chitosan (CH), and wherein the anionic polymer in the second layer comprises a poly(acrylic acid) (PAA), a poly(methacrylic acid) (PMAA), a poly(sodium phosphate) (PSP), or a poly(vinyl sulfate) (PVS);
   wherein the first layer of each bilayer has a concentration of the cationic polymer, and wherein the concentration of the cationic polymer increases in each successive first layer of the plurality of bilayers moving from an inner surface of the coating adjacent the substrate to an outer surface of the coating distal the substrate.

2. The textile of claim 1, wherein the cationic polymer in the first layer comprises a polydiallyldimethylammonium chloride (PDDA), and wherein the anionic polymer in the second layer comprises a poly(acrylic acid) (PAA).

3. The textile of claim 1, wherein the cationic polymer in the first layer of each bilayer comprises CH.

4. The textile of claim 1, wherein the cationic polymer in the first layer of one bilayer is different than the cationic polymer in the first layer of another bilayer.

5. The textile of claim 1, wherein the plurality of bilayers comprises at least four bilayers or at least ten bilayers.

6. The textile of claim 1, wherein the substrate has a first surface and the coating is applied to the first surface;
   wherein the coating has a thickness Tc measured between an innermost surface of the coating adjacent the first surface of the substrate and an outermost surface of the coating distal the substrate, wherein the thickness Tc is less than 1.0 micron; and
   wherein each bilayer has a thickness Tb from 1 nm to 100 nm.

7. The textile of claim 1, wherein the substrate has a weight Ws and the coating has a weight Wc, wherein the weight Wc divided by the weight Ws is less than 0.05.

8. The textile of claim 1, wherein the substrate comprises polyester.

9. The textile of claim 1, wherein the surface of the substrate has an average surface roughness greater than or equal to 1.0 microns.

10. The textile of claim 1, wherein the coating reduces the adhesion of *S. aureus* or *P. aeruginosa* bacteria by at least 95 percent or by at least 99 percent, as characterized by the Bacterial Adhesion Testing.

11. Clothing or linen comprising the textile of claim 1.

12. The textile of claim 3, wherein the cationic polymer in the first layer of each bilayer consists essentially of CH.

* * * * *